US006963601B1

(12) United States Patent
Kim et al.

(10) Patent No.: US 6,963,601 B1
(45) Date of Patent: Nov. 8, 2005

(54) APPARATUS AND METHOD FOR SPREADING CHANNEL DATA IN CDMA COMMUNICATION SYSTEM USING ORTHOGONAL TRANSMIT DIVERSITY

(75) Inventors: Jae-Yoel Kim, Kunpo-shi (KR); Seung-Joo Maeng, Songnam-shi (KR); Jae-Min Ahn, Seoul (KR); Hae-Won Kang, Seoul (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 09/497,743

(22) Filed: Feb. 4, 2000

(30) Foreign Application Priority Data

Feb. 4, 1999 (KR) ................................. 1999-4899

(51) Int. Cl.[7] .............................................. H04B 1/69
(52) U.S. Cl. ..................................................... 375/146
(58) Field of Search ................................. 375/130, 135, 375/136, 146, 147, 211, 214, 134, 137, 145, 375/149, 240.23

(56) References Cited

U.S. PATENT DOCUMENTS

| 5,305,353 A | 4/1994 | Weerackody ............... 375/100 |
| 5,394,435 A | 2/1995 | Weerackody ............... 375/206 |
| 5,652,764 A | 7/1997 | Kanzaki et al. ............ 375/200 |
| 5,680,414 A * | 10/1997 | Durrant et al. ............ 375/150 |
| 6,173,007 B1 * | 1/2001 | Odenwalder et al. ....... 375/146 |
| 6,275,519 B1 * | 8/2001 | Hendrickson ............... 375/138 |
| 6,400,703 B1 * | 6/2002 | Park et al. .................. 370/342 |
| 6,424,631 B1 * | 7/2002 | Czaja et al. ................ 370/252 |
| 6,490,267 B1 * | 12/2002 | Kim et al. .................. 370/342 |

FOREIGN PATENT DOCUMENTS

| JP | 2002-516519 | 4/2002 |
| WO | WO 99/60739 | 11/1999 |

* cited by examiner

*Primary Examiner*—Tesfaldet Bocure
*Assistant Examiner*—Pankaj Kumar
(74) *Attorney, Agent, or Firm*—Dilworth & Barrese LLP

(57) ABSTRACT

A channel spreading method in a CDMA communication system which spreads a pair of symbols obtained by repeating one symbol with a quasi-orthogonal code having a given length to transmit the spread symbols through a first antenna and spreads said symbol and an inverted symbol of said symbol with said quasi-orthogonal code to transmit the spread symbols through a second antenna. The method comprises spreading one of said pair of symbols with a portion of said quasi-orthogonal code and spreading another symbol of said pair of symbols with a remaining portion of said quasi-orthogonal code; and spreading said symbol with a portion of said quasi-orthogonal code and spreading said inverted symbol with the remaining portion of said quasi-orthogonal code.

4 Claims, 20 Drawing Sheets

APPARATUS AND METHOD FOR SPREADING CHANNEL DATA IN CDMA COMMUNICATION SYSTEM USING ORTHOGONAL TRANSMIT DIVERSITY

PRIORITY

This application claims priority to an application entitled "Apparatus and Method for Spreading Channel Data in CDMA Communication System Using Orthogonal Transmit Diversity" filed in the Korean Industrial Property Office on Feb. 4, 1999 and assigned Serial No. 99-4899, the contents of which are hereby incorporated by reference.

BACKGROUND OF THE INVENTION

1. Field of the Invention

The present invention relates generally to an apparatus and method for spreading channel data in a CDMA communication system, and in particular, to an apparatus and method for spreading channel data in a CDMA communication system using orthogonal transmit diversity (OTD).

2. Description of the Related Art

In order to increase channel capacity, a CDMA (Code Division Multiple Access) communication system spreads channels using orthogonal codes. For example, the forward link of an IMT-2000 system performs channel spreading using orthogonal codes. A reverse link can also perform channel spreading using orthogonal codes through time alignment. An example of an orthogonal code that is typically used is a Walsh code.

The number of available orthogonal codes is determined depending upon a modulation method and a minimum data rate. However, in the proposed IMT-2000 CDMA system, the channels assigned to the users will increase in number in order to improve system performance. To this end, the future CDMA system includes a plurality of common channels and dedicated channels, and assigns the channels to the mobile stations, thereby increasing channel capacity.

However, even in the proposed IMT-2000 CDMA system, an increase in the utilization of the channels limits the number of available orthogonal codes. Further, the reduced number of available Walsh orthogonal codes limits the increase in channel capacity. In an effort to solve this problem, a method has been proposed for using quasi-orthogonal codes for channel spreading codes which have a minimum interference with the orthogonal codes and have a variable data rate.

In the IMT-2000 system, a 1× system uses a spreading code group having a spreading code rate 1, and a 3× system uses a spreading code group having a spreading code rate 3. In the 1× system, the spreading code generator stores spreading codes with a maximum length of 128 and generates a spreading code corresponding to a designated spreading code index to spread code symbols with the generated spreading code. Further, in the 3× system, the spreading code generator stores spreading codes with a maximum length of 256 and generates a spreading code corresponding to a designated spreading code index to spread code symbols with the generated spreading code.

The IMT-2000 system supports a transmit diversity, for which an orthogonal transmit diversity (ODT) scheme is typically used. Further, the IMT-2000 system can support a multicarrier system. Therefore, the IMT-2000 system can either employ or not employ orthogonal transmit diversity for the 1× direct spreading (DS) system according to circumstances. Further, for the 3× system, the IMT-2000 system can support both the multicarrier system and the direct spreading system, wherein orthogonal transmit diversity can be either used or not used for the direct spreading system.

The orthogonal transmit diversity scheme inputs the coded symbols to first and second antennas by dividing, and then divides again the signals input to the first and second antennas into two components respectively by demultiplexing to transmit them via the different antennas. At this point, the symbol rate decreases by half, because the signals input to the first and second antennas are divided into two components by the demultiplexer. Therefore, in order to match the halved symbol rate to the total symbol rate, the divided input symbols are repeated and the pair of symbols (both the original and the repeated symbol) are orthogonally spread. One of the divided components goes to the first antenna, and the second divided component goes to the second antenna. The signal input to the first and second antennas is divided again into two components by demultiplexing, which results in a total of 4 components from the original signal. Then, the 4 components are orthogonally spread with independent orthogonal codes.

In the orthogonal transmit diversity scheme, the respective component symbols undergo repetition before orthogonal spreading. Spreading the repeated symbols with the respective spreading factors is equivalent to spreading one symbol with twice the spreading factors. The receiver then accumulates the chips for two times the spreading factor duration during spreading and multiplexes the accumulated chips. Since spreading the chips using the quasi-orthogonal codes is equivalent to spreading each component chip with twice the spreading factor in the orthogonal transmit diversity scheme, the correlation property of the quasi-orthogonal codes may vary. Actually, when using orthogonal codes of length 256, the correlation for 256 chip duration is ±16 and ±16j. Therefore, any orthogonal transmit diversity scheme should consider the effect of spreading the chips with twice the spreading factor, when selecting the quasi-orthogonal codes for use in the spreading scheme using the quasi-orthogonal codes.

FIG. 1 shows a transmitter using an orthogonal transmit diversity scheme. Referring to FIG. 1, a channel encoder 110 encodes input data into coded symbols, and an interleaver 130 interleaves the coded symbols and provides the interleaved symbols to an adder 120. At this point, a long code generator 100 generates a long code and a decimator 105 decimates the generated long code and provides the decimated long code to the adder 120. The adder 120 adds the decimated long code and the interleaved code symbols, and a demultiplexer 140 demultiplexes the signals input from the adder 120 to the first and second antennas.

The signals demultiplexed to the first and second antennas are input to demultiplexers 150 and 155. The demultiplexer 150 demultiplexes the I-component input signal for the first antenna into I1 and Q1 components, and provides the I1 and Q1 components to symbol repeaters 160 and 162, respectively. Similarly, the demultiplexer 155 demultiplexes the Q-component input signal for the second antenna into I2 and Q2 components, and provides the I2 and Q2 components to symbol repeaters 164 and 166, respectively. The symbol repeaters 160 and 162 repeat their input signal I1 and Q1 two times, respectively. The symbol repeater 164 outputs the I2 signal once and then outputs an inverted input signal. Similarly, the symbol repeater 166 outputs the Q2 signal once and then outputs an inverted input signal. In order to maintain the orthogonality between the first and second antenna signals demultiplexed by the demultiplexer 140, the symbol repeaters 160 and 162 repeat the input symbols in the different manner from the symbol repeaters 164 and 166. Although the symbol repeaters 160 and 162 have a similar operation to the existing symbol repetition, the symbol repeaters 164 and 166 repeat the input symbols in different manner. For example, upon receipt of an input signal '1', the repeaters 164 and 166 output a symbol '1' and an inverted symbol '−1'.

Thereafter, a spreader 170 receives the signals output from the symbol repeaters 160 and 162, and at the same time, a spreading code generator 180 generates a spreading code corresponding to an input spreading code index k1 and provides the generated spreading code to the spreader 170. The spreader 170 then spreads the signals output from the symbol repeaters 160 and 162 with the spreading code. Further, a spreader 175 receives the signals output from the symbol repeaters 164 and 166, and at the same time, a spreading code generator 185 generates a spreading code corresponding to an input spreading code index k2 and provides the generated spreading code to the spreader 175. The spreader 175 then spreads the signals output from the symbol repeaters 164 and 166 with the spreading code.

FIG. 2 shows a receiver using orthogonal transmit diversity. Referring to FIG. 2, a despreader 270 receives input data rI1 and rQ1, and at the same time, a spreading code generator 280 generates the spreading code corresponding to an input spreading code index k1 and provides the generated spreading code to the despreader 270. The despreader 270 then despreads the input data rI1 and rQ1 using the spreading code provided from the spreading code generator 280 and provides the despread signals to a multiplexer 250. Similarly, a despreader 275 receives input data rI2 and rQ2, and at the same time, a spreading code generator 285 generates the spreading code corresponding to an input spreading code index k2 and provides the generated spreading code to the despreader 275. The despreader 275 then despreads the input data rI2 and rQ2 using the spreading code provided from the spreading code generator 285 and provides the despread signals to a multiplexer 255.

The multiplexer 250 multiplexes the signals output from the despreader 270 to output a first antenna component, and the multiplexer 255 multiplexes the signals output from the despreader 275 to output a second antenna component. A multiplexer 240 multiplexes the first and second antenna components and provides the multiplexed signals to an adder 220. At the same time, a long code generator 200 generates a long code and a decimator 205 decimates the long code and provides the decimated long code to the adder 220. The adder 220 then adds the decimated long code and the codes output from the multiplexer 240, and a deinterleaver 230 deinterleaves the signals output from the adder 220. A channel decoder 210 decodes the signals output from the deinterleaver 230.

FIG. 3 shows a direct spreading scheme which does not use orthogonal transmit diversity. Referring to FIG. 3, a channel encoder 310 encodes input data into coded symbols, and an interleaver 330 interleaves the coded symbols and provides the interleaved symbols to an adder 320. At the same time, a long code generator 300 generates a long code and a decimator 305 decimates the long code and provides the decimated long code to the adder 320. The adder 320 then adds the decimated long code and the interleaved code symbols, and provides its outputs to a demultiplexer 340. The demultiplexer 340 demultiplexes the input signals into an I-component signal and a Q-component signal. A spreader 370 receives the I-component and Q-component signals, and at the same time, a spreading code generator 380 generates a spreading code corresponding to an input spreading code index k and provides the generated spreading code to the spreader 370. The spreader 370 then spreads the I-component and Q-component signals output from the demultiplexer 340 with the spreading code.

FIG. 4 shows a receiver which does not use orthogonal transmit diversity. Referring to FIG. 4, a despreader 470 receives input data I and Q, and at the same time, a spreading code generator 480 provides the despreader 470 with a spreading code corresponding to an input spreading code index k. The despreader 470 despreads the input data I and Q using the spreading code provided from the spreading code generator 480, and provides the despread signals to a multiplexer 440. The multiplexer 440 multiplexes the despread I and Q components, and provides the multiplexed signals to an adder 420. At this point, a long code generator 400 generates a long code, and a decimator 405 decimates the long code and provides the decimated long code to the adder 420. The adder 420 adds the decimated long code and the codes output from the multiplexer 440, and provides its output signals to a deinterleaver 430. The deinterleaver 430 deinterleaves the input signals and a channel decoder 410 decodes the deinterleaved signals.

The IMT-2000 system having the above spreading scheme supports a multicarrier system. The multicarrier mobile communication system transmits signals at one carrier of a 1.25 MHz band for the 1× system, and transmits the signals at three carriers for 3× system. The respective carriers are assigned independent orthogonal codes. When the 1× system is overlaid with the 3× system, using orthogonal codes of different lengths will cause interference between the systems. Herein, it will be assumed that the 1× system generates a quasi-orthogonal code using a mask function of length 128, and the 3× system generates a quasi-orthogonal code using a mask function of length 256. In this case, since a good correlation property is not guaranteed between a spreading code of length 128 which uses a mask function at a spreading rate 1 and a spreading code of length 128 which uses a mask function at a spreading rate 3 at each 1.25 MHz band, increased interference may occur between a user using a mask function at the spreading rate 1 and a user using a mask function at the spreading rate 3.

When the 1× system uses the quasi-orthogonal code and the 3× system uses the orthogonal code, interference that the quasi-orthogonal code $(QOF_m+W_k)$ user of the 1×system, experiences from the orthogonal code $(W_j)$ user of the 3× system can be given by the equation:

$$\sum_i^{T_i} [(QOF_{m,i} + W_{k,i}) + W_{j,i}] = \sum_i^{T_i} [QOF_{m,i} + (W_{k,i} + W_{j,i})] = \sum_i^{T_i} [QOF_{m,i} + W_{s,i}] < \Theta_{min} \quad (1)$$

That is, the interference satisfies an upper limit formula of the correlation for the quasi-orthogonal code. Therefore, in this case, this is not a serious matter. However, when the 1× system and 3× system both use the quasi-orthogonal code, interference that the quasi-orthogonal code $(QOF_m+W_k)$ user of the 1× system experiences from the quasi-orthogonal code $(QOF_n+W_j)$ user of the 3× system does not satisfy the upper limit formula, as shown in Equation (2) below:

$$\sum_{i}^{T_i} [(QOF_{m,i} + W_{k,i}) + (QOF_{n,i} + W_{j,i})] = \qquad (2)$$

$$\sum_{i}^{T_i} [(QOF_{m,i} + W_{k,i}) + (QOF_{n,i} + W_{j,i})] =$$

$$\sum_{i}^{T_i} [(QOF_{m,i} + QOF_{n,i}) + W_{s,i}]$$

In this case, the mutual interference between the channels increases.

Therefore, when using the quasi-orthogonal codes of spreading code groups having different lengths, the mobile communication system stores the spreading codes of different lengths, and thus increases the hardware complexity. Further, using the spreading codes having different spreading rates in the overlay scheme deteriorates the interference property between two users thereby causing performance degradation.

FIG. 5 shows a transmitter for a 3× multicarrier system. Referring to FIG. 5, a channel encoder 500 encodes an input signal into coded symbols, and an interleaver 505 interleaves the coded symbols. A long code spreader 510 spreads the interleaved symbols with a long code output from a long code generator 515. A demultiplexer 580 demultiplexes the spread signals into three components, each of which is divided again into I component and Q component, and provides the I and Q components to spreaders 520, 522 and 524.

When the spreader 520 receives the signals from the demultiplexer 580, a spreading code generator 540 generates a spreading code of length 256 corresponding to an input spreading code index k indicating a channel assigned to the user, and provides the generated spreading code to the spreader 520. The spreader 520 spreads the long code spread signals at a chip rate of 1.2288 Mcps by operating each symbol of the input signal with a specified number of chips ($256/2^n$, $0 \leq n \leq 6$) of the spreading code. When the spread signals are input to a PN spreader 530, a short PN code generator 550 generates a short PN code and outputs the generated short PN code at a chip rate of 1.2288 Mcps. The PN spreader 530 PN spreads the input signals with the PN codes output from the short PN code generator 550. Since the other spreaders and spreading code generators have the same operation, a detailed description will not be given in order to avoid duplication.

FIG. 6 shows a receiver for the 3× multicarrier system. Referring to FIG. 6, when the spread signals are input to a PN despreader 630, a short PN code generator 650 generates a short PN code and outputs the generated short PN code at a chip rate of 1.2288 Mcps. The PN despreader 630 operates the input signals and the short PN code on a chip unit basis to output PN despread signals.

When the PN despread signals are input to a despreader 620, a spreading code generator 640 generates a spreading code of a maximum length 256 corresponding to an input spreading code index k indicating a channel assigned to the user, and provides the generated spreading code to the despreader 620. The despreader 620 then operates on each symbol of the PN despread signal with a specified number of chips ($256/2^n$, $0 \leq n \leq 6$) of the spreading code, and accumulates the signals. The despread signals from the despreader 620 are provided to a multiplexer 680. In the same manner, the signals input to PN despreaders 632 and 634 are provided to the multiplexer 680 after despreading. The multiplexer 680 then multiplexes the input signals despread through three different paths in the reverse order of signal demultiplexing performed in the transmitter. When the multiplexed signals are input to a long code despreader 610, a long code generator 615 generates a long code. The long code despreader 610 despreads the multiplexed signals with the long code output from the long code generator 615. A deinterleaver 605 deinterleaves the long code despread signals and a channel decoder 600 decodes the deinterleaved signals.

In the CDMA communication system using orthogonal transmit diversity, even though the same symbol is repeated two times when spreading the signals transmitted to the respective antennas, it is undesirably necessary to spread the symbols using the orthogonal codes according to the spreading rates of the respective symbols.

SUMMARY OF THE INVENTION

It is, therefore, an object of the present invention to provide a device and method for spreading a transmission signal with a spreading code having at least two times a spreading factor in a chip spreading rate in a CDMA communication system using orthogonal transmit diversity.

It is another object of the present invention to provide a device and method for enabling two users having different spreading rates to spread transmission signals using spreading codes of the same length in a CDMA communication system.

To achieve the above objects, there is provided a channel spreading method in a CDMA communication system which spreads a pair of symbols obtained by repeating one symbol with a quasi-orthogonal code having a given length to transmit the spread symbols through a first antenna and spreads said symbol and an inverted symbol of said symbol with said quasi-orthogonal code to transmit the spread symbols through a second antenna. The method comprises spreading one of said pair of symbols with a portion of said quasi-orthogonal code and spreading another symbol of said pair of symbols with a remaining portion of said quasi-orthogonal code; and spreading said symbol with a portion of said quasi-orthogonal code and spreading said inverted symbol with the remaining portion of said quasi-orthogonal code.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The term "orthogonal spreading" as used herein has the same meaning as the term "channel spreading". Further, the term "spreading codes of the same length" means quasi-orthogonal code sets having the same length.

In an exemplary embodiment of the present invention, a description will be made of spreading and despreading operation of the IMT-2000 base station and mobile station, wherein the 1× system and the 3× system use spreading codes of the same length. It is also possible to apply the invention to the systems using the spreading codes of different lengths.

A description has already been made of the spreader in the transmitter and receiver of FIGS. 1 to 6. The spreaders for the transmitter and the receiver are identical except for the operation of a rotator therein.

Figure 7:
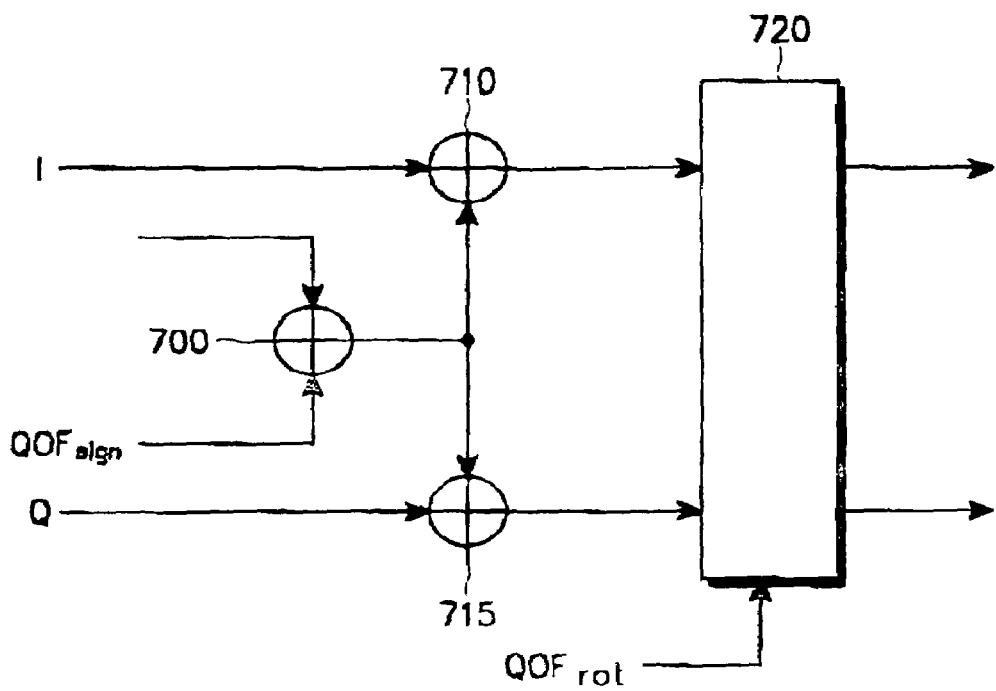
FIG. 7 is a diagram illustrating a spreading scheme for the transmitter and receiver in a mobile communication system according to an embodiment of the present invention.

FIG. 7 shows a spreader for a CDMA communication system according to an embodiment of the present invention. Herein, the quasi-orthogonal code is a code generated by mixing a Walsh orthogonal code and a QOF mask, wherein the QOF mask is comprised of a sign code $QOF_{sign}$ and phase code $QOF_{rot}$. Further, the phase code has the same value as a specific Walsh orthogonal code.

Referring to FIG. 7, when adders 710 and 715 receive I and Q signals, an adder 700 adds a first Walsh code Walsh1 and a sign component $QOF_{sign}$ and provides its output to the adders 710 and 715. Here, the first Walsh code Walsh1 is a Walsh code for generating the quasi-orthogonal code. The adder 710 adds the input signal I and the output signal of the adder 700 and provides its output to a rotator 720, and the adder 715 adds the input signal Q and the output signal of the adder 700 and provides its output to the rotator 720. The rotator 720 then rotates the signals input from the adders 710 and 715 according to $QOF_{rot}$. Here, $QOF_{rot}$ is used to control a phase of the spread signal.

Figure 8:
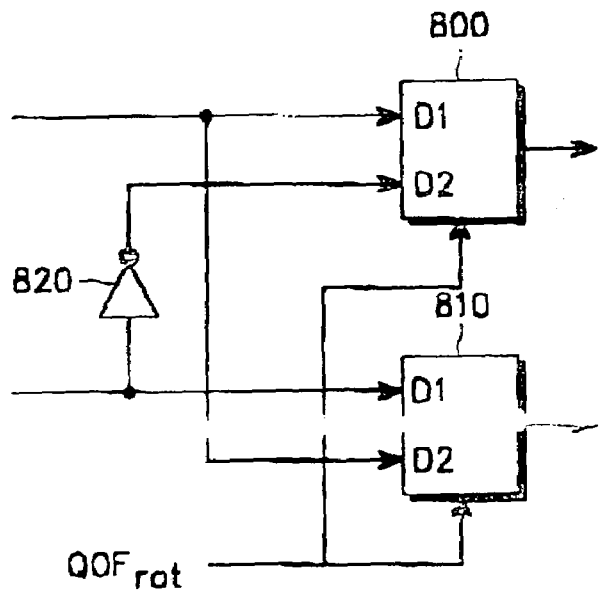
FIG. 8 is a diagram illustrating a rotator in the spreading scheme of FIG. 7 for the transmitter according to an embodiment of the present invention.

FIG. 8 shows the rotator 720 in the spreader of FIG. 7 for the transmitter. Referring to FIG. 8, the signal output from the adder 710 is input to a D1 node of a selector 800 and a D2 node of a selector 810, and the signal output from the adder 715 is input to an inverter 820 and a D1 node of the selector 810. The inverter 820 inverts the input signal by multiplying it by '−1' and provides the inverted signal to a D2 node of the selector 800. The selectors 800 and 810 output the signals received at their D1 nodes when the $QOF_{rot}$ is '0', and otherwise, output the signals received at their D2 nodes.

Figure 9:
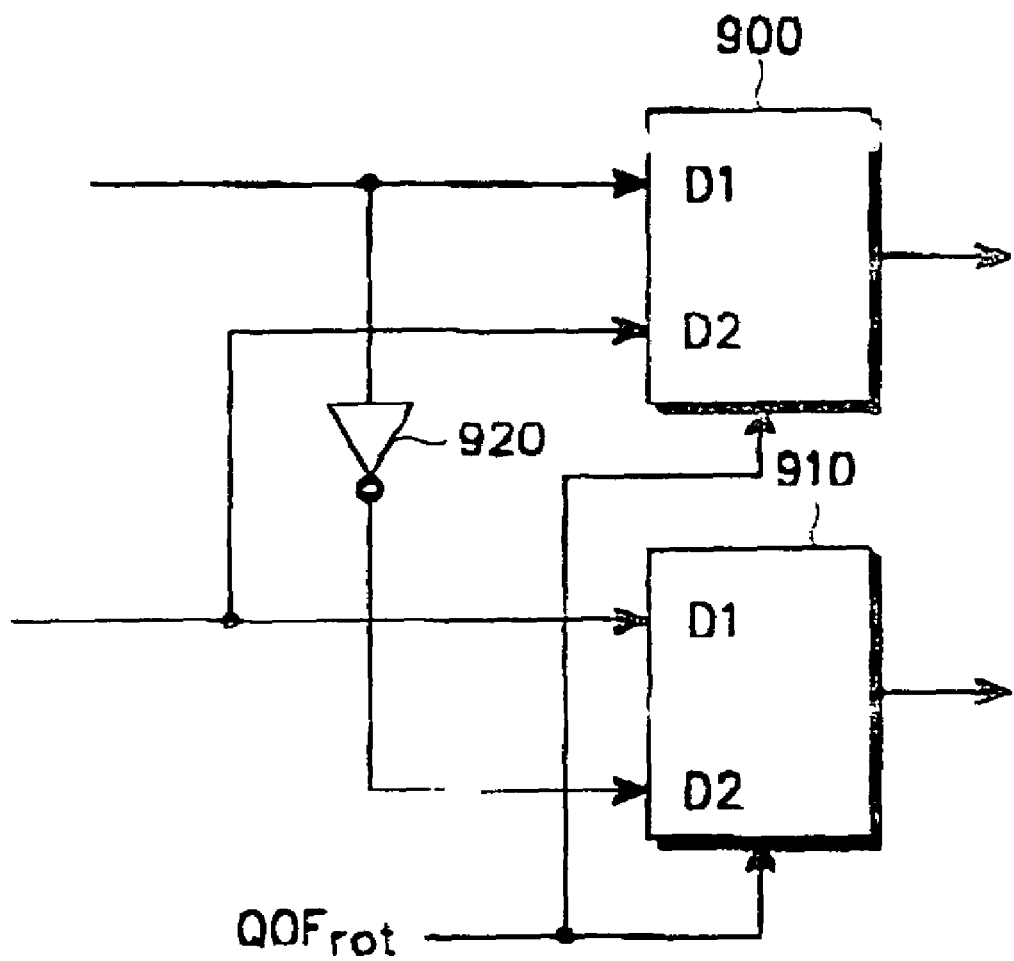
FIG. 9 is a diagram illustrating a rotator in the despreading scheme of FIG. 7 for the receiver according to an embodiment of the present invention.

FIG. 9 shows the rotator 720 in the despreader of FIG. 7 for the receiver. Referring to FIG. 9, the signal output from the adder 710 is input to a D1 node of a selector 900 and an inverter 920. The inverter 920 inverts the input signal by multiplying it by '−1' and provides the inverted signal to a D2 node of a selector 910. The signal output from the adder 715 is input to a D2 node of the selector 900 and a D1 node of the selector 910. The selectors 900 and 910 output the signals received at their D1 nodes when $QOF_{rot}$ is '0', and otherwise, output the signals received at their D2 nodes.

In the embodiments of the present invention, the quasi-orthogonal sequence mask function of length 128 and the quasi-orthogonal sequence of length 256 are used, which are disclosed in Korean patent application Nos. 99-888 and 99-1339. The quasi-orthogonal sequence mask function of length 128 and the quasi-orthogonal sequence of length 256 should have (1) a good full correlation property with the Walsh orthogonal code, (2) a good full correlation property between quasi-orthogonal codes, and (3) a good full partial correlation property with the Walsh orthogonal code. In addition, they should have a good partial correlation property between the quasi-orthogonal codes. The invention also provides quasi-orthogonal codes of length 128 and quasi-orthogonal codes of length 256 that satisfy the above conditions.

In the embodiments below, the orthogonal transmit diversity scheme uses the quasi-orthogonal sequences. Further, the multicarrier system also uses the quasi-orthogonal sequences. In the various embodiments below, the overall system operation is similar except the spreader. Further, since only the process for processing the spreading codes of different lengths is varied, the description of the invention will be made with reference to the timing diagrams for the symbols in the rotator 720 of FIG. 7.

A. First Embodiment

In the first embodiment, the 1× direct spreading system uses quasi-orthogonal sequences of length 128, the 3× direct spreading system uses quasi-orthogonal sequences of length 256, and the 3× multicarrier system uses quasi-orthogonal sequences of length 256.

Figure 10A:
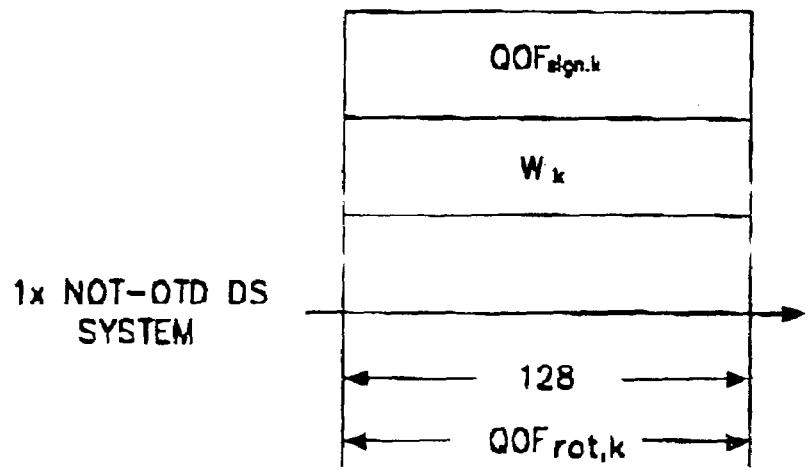
FIG. 10A is a timing diagram explaining the operation of a spreader in a 1× direct spreading system not using orthogonal transmit diversity according to a first embodiment of the present invention.

A description will be made of spreading operation in the 1× direct spreading system not using orthogonal transmit diversity (or 1× non-OTD direct spreading system), with reference to FIGS. 7 and 10A. The 1× direct spreading system not using orthogonal transmit diversity uses the spreading codes of length 128, shown in FIG. 10A, output from the rotator 720 of FIG. 7. In FIG. 7, when the I and Q component symbols are input to the adders 710 and 715, the adder 700 adds a Walsh code of length 128 and a sign component $QOF_{sign}$ of a quasi-orthogonal sequence of length 128 as shown in FIG. 10A, and provides its output to the adders 710 and 715. The adders 710 and 715 add the I and Q component input symbols, respectively, and the output of the adder 700, and provide their output signals to the rotator 720. The rotator 720 rotates the 128-chip input signals according to the input phase component $QOF_{rot}$ of the quasi-orthogonal code of length 128. Referring to FIG. 10A, one input symbol is added to the Walsh orthogonal code of length 128 and the sign component $QOF_{sign}$ of the quasi-orthogonal code of length 128, and then rotated according to the phase component $QOF_{rot}$ of the quasi-orthogonal code of length 128.

Figure 10B:
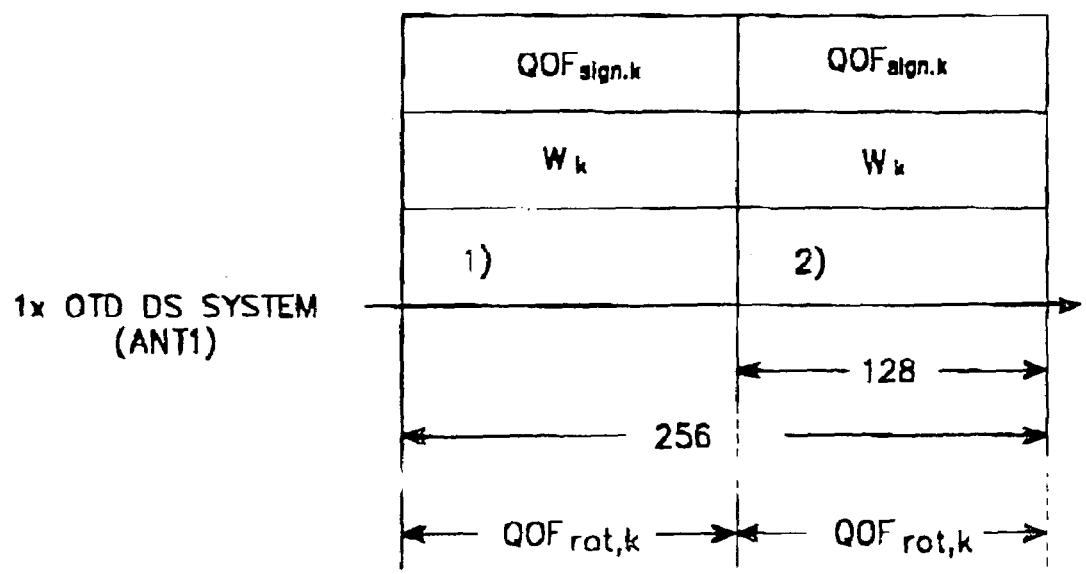
FIG. 10B is a timing diagram explaining the operation of a spreader at a first antenna in a 1× direct spreading system using orthogonal transmit diversity according to a first embodiment of the present invention.
Figure 10C:
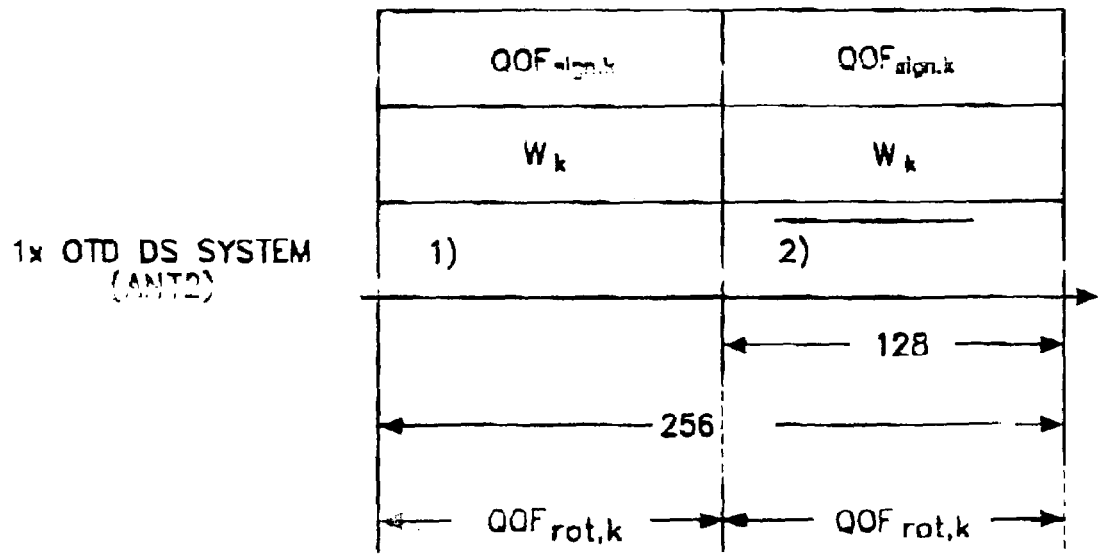
FIG. 10C is a timing diagram explaining the operation of a spreader at a second antenna in the 1× direct spreading system using orthogonal transmit diversity according to a first embodiment of the present invention.

Next, a description will be made of spreading operation in the 1× direct spreading system using orthogonal transmit diversity (or 1× OTD direct spreading system), with reference to FIGS. 7, 10B and 10C, wherein FIGS. 10B and 10C show the timing diagrams for the first and second antennas, respectively.

Figure 1:
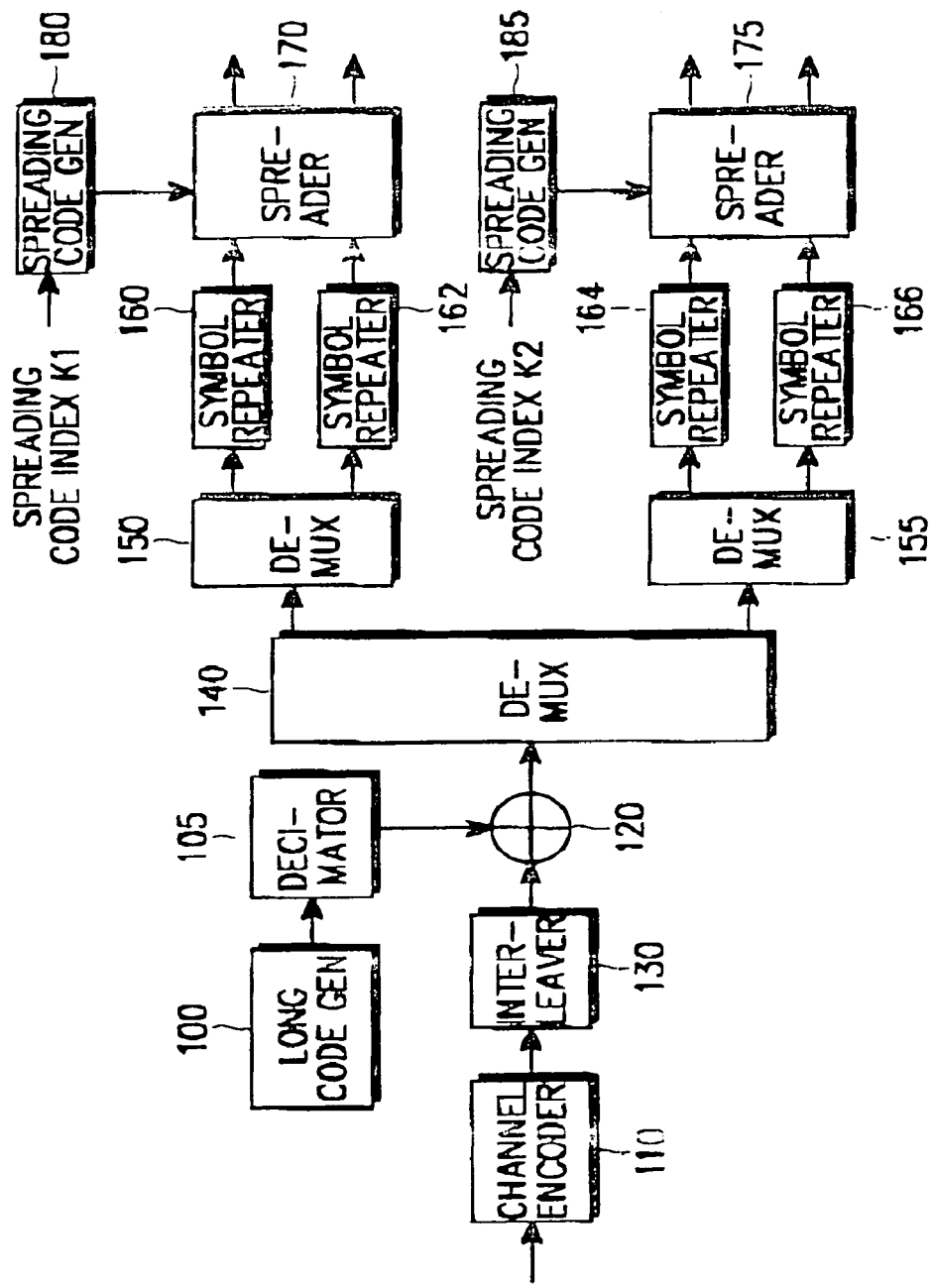
FIG. 1 is a diagram illustrating a transmitter using an orthogonal transmit diversity in a mobile communication system.
Figure 2:
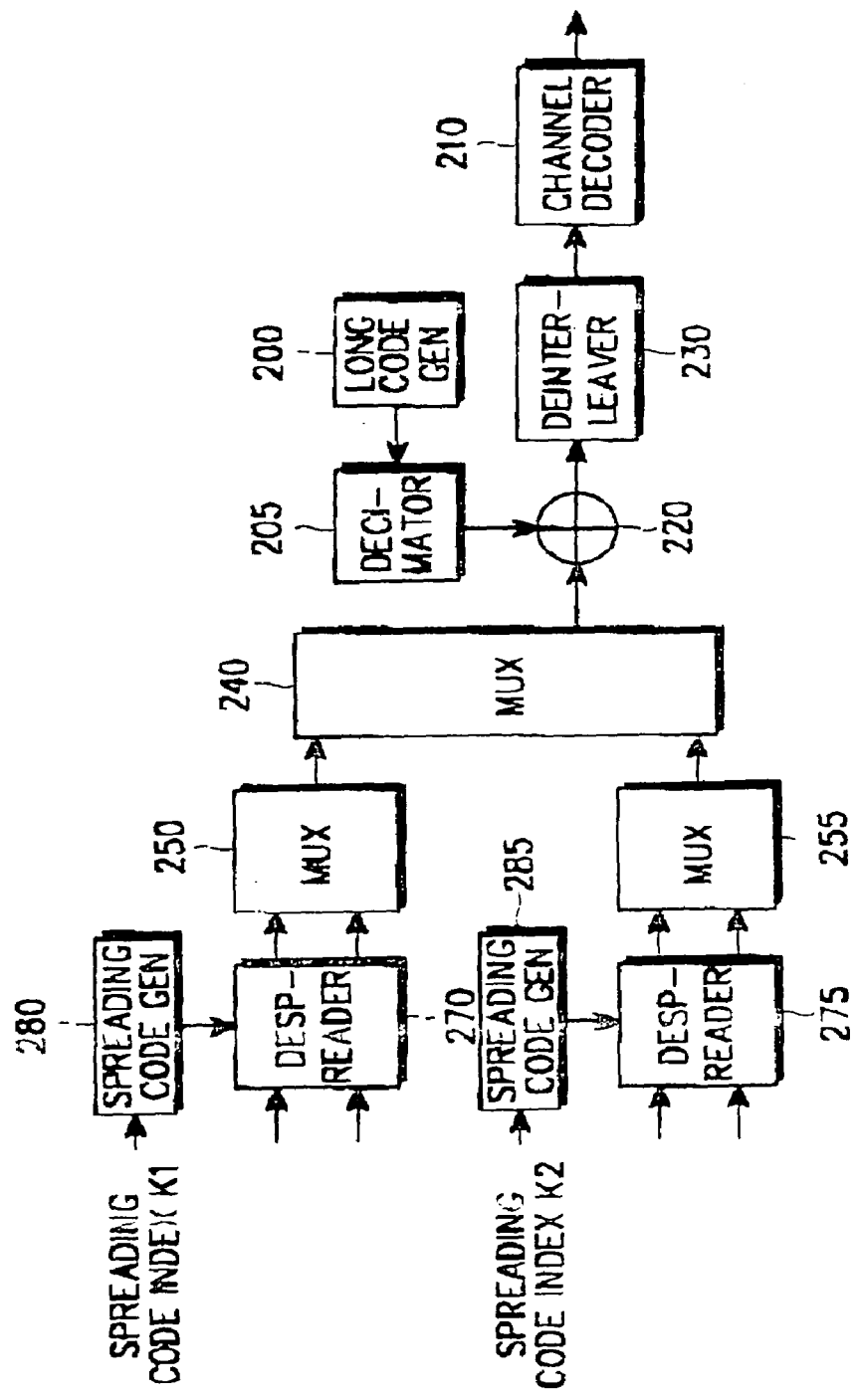
FIG. 2 is a diagram illustrating a receiver using orthogonal transmit diversity in a mobile communication system.
Figure 3:
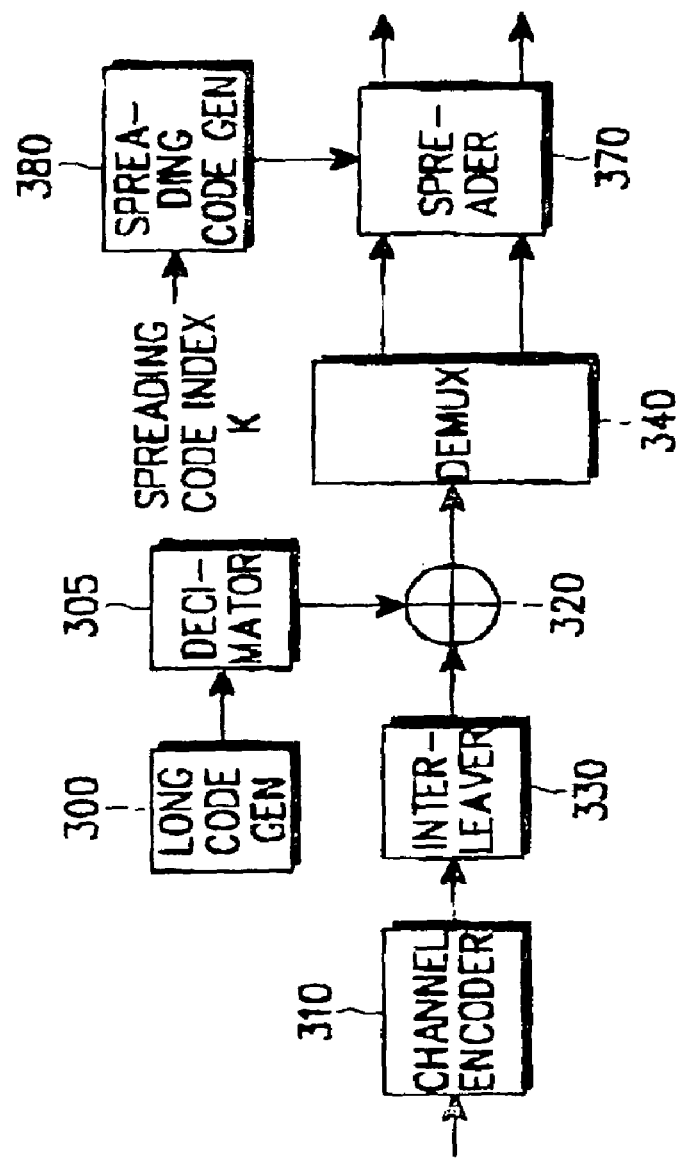
FIG. 3 is a diagram illustrating a transmitter not using orthogonal transmit diversity in a mobile communication system.
Figure 4:
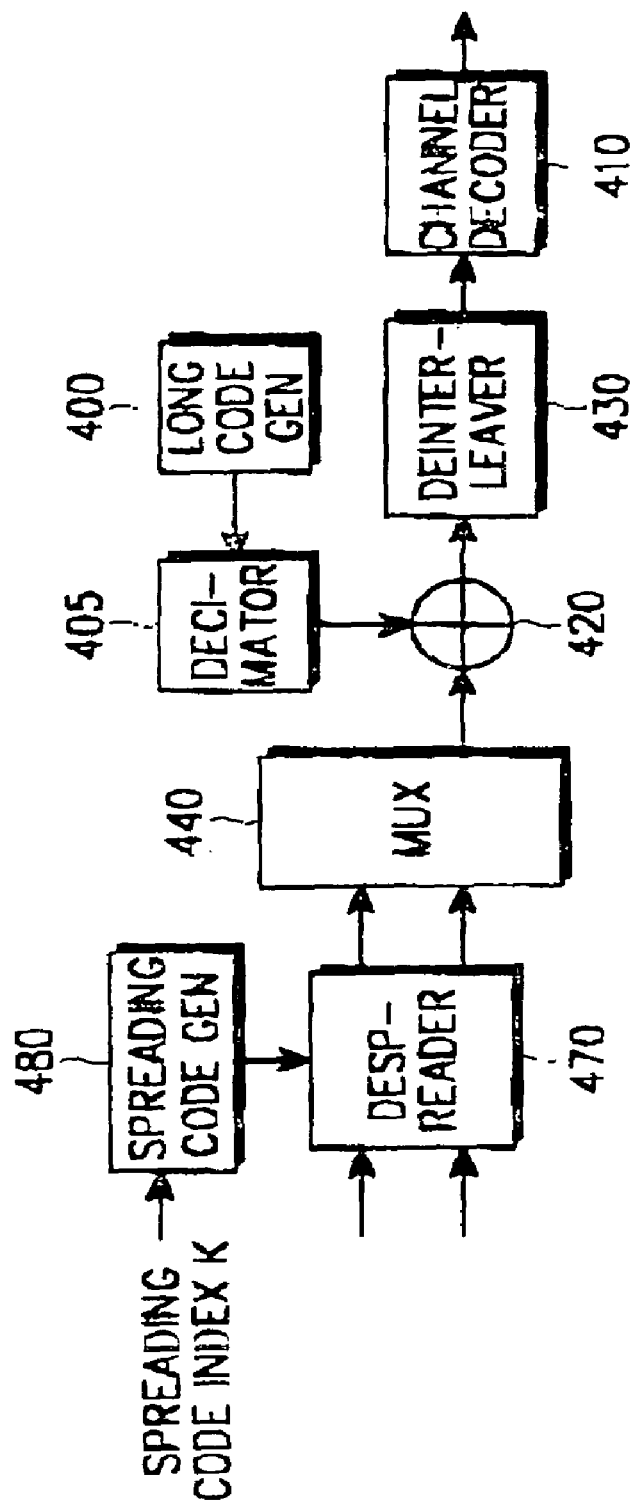
FIG. 4 is a diagram illustrating a receiver not using orthogonal transmit diversity in a mobile communication system.
Figure 5:
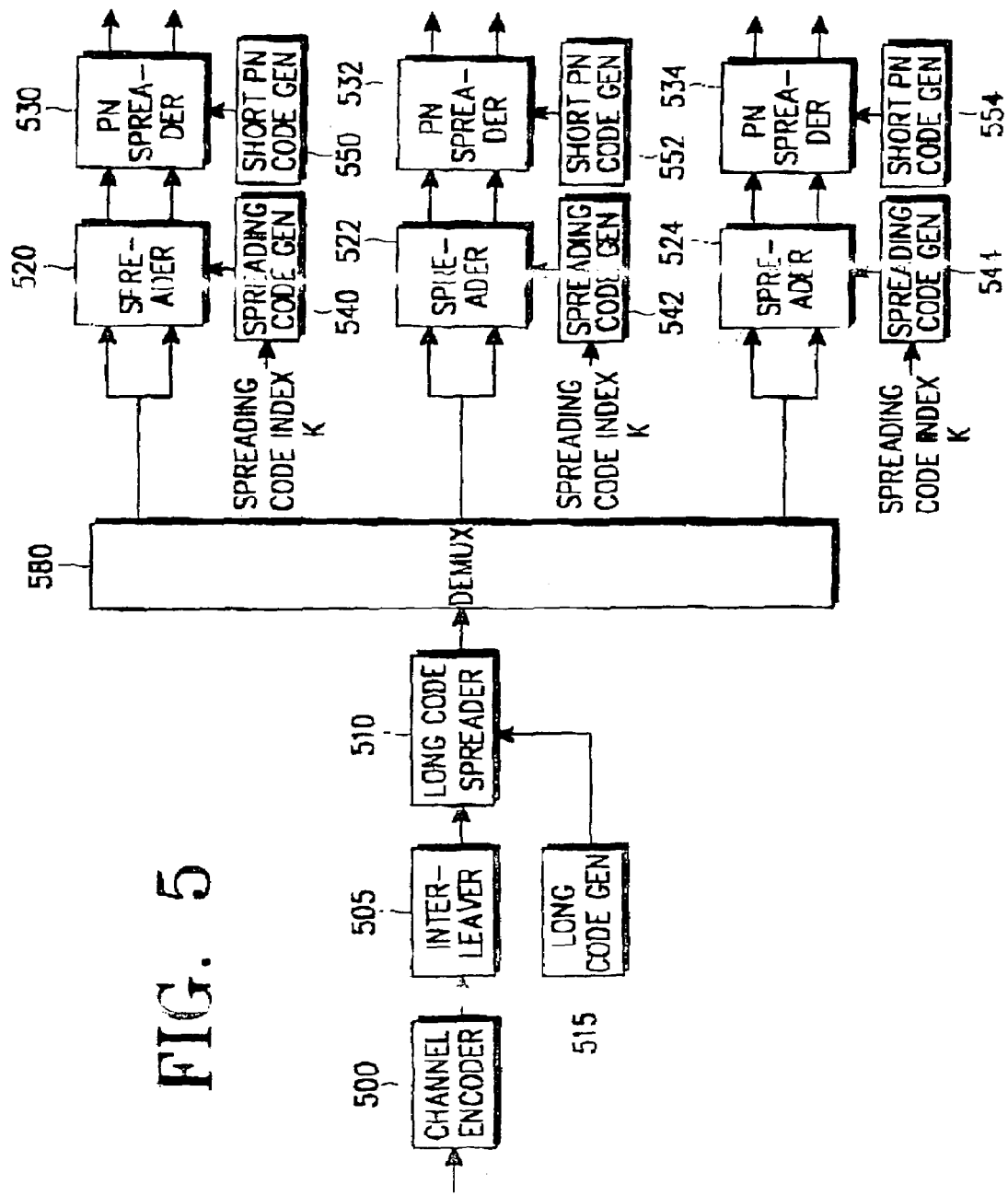
FIG. 5 is a diagram illustrating a transmitter in a 3× multicarrier mobile communication system.
Figure 6:
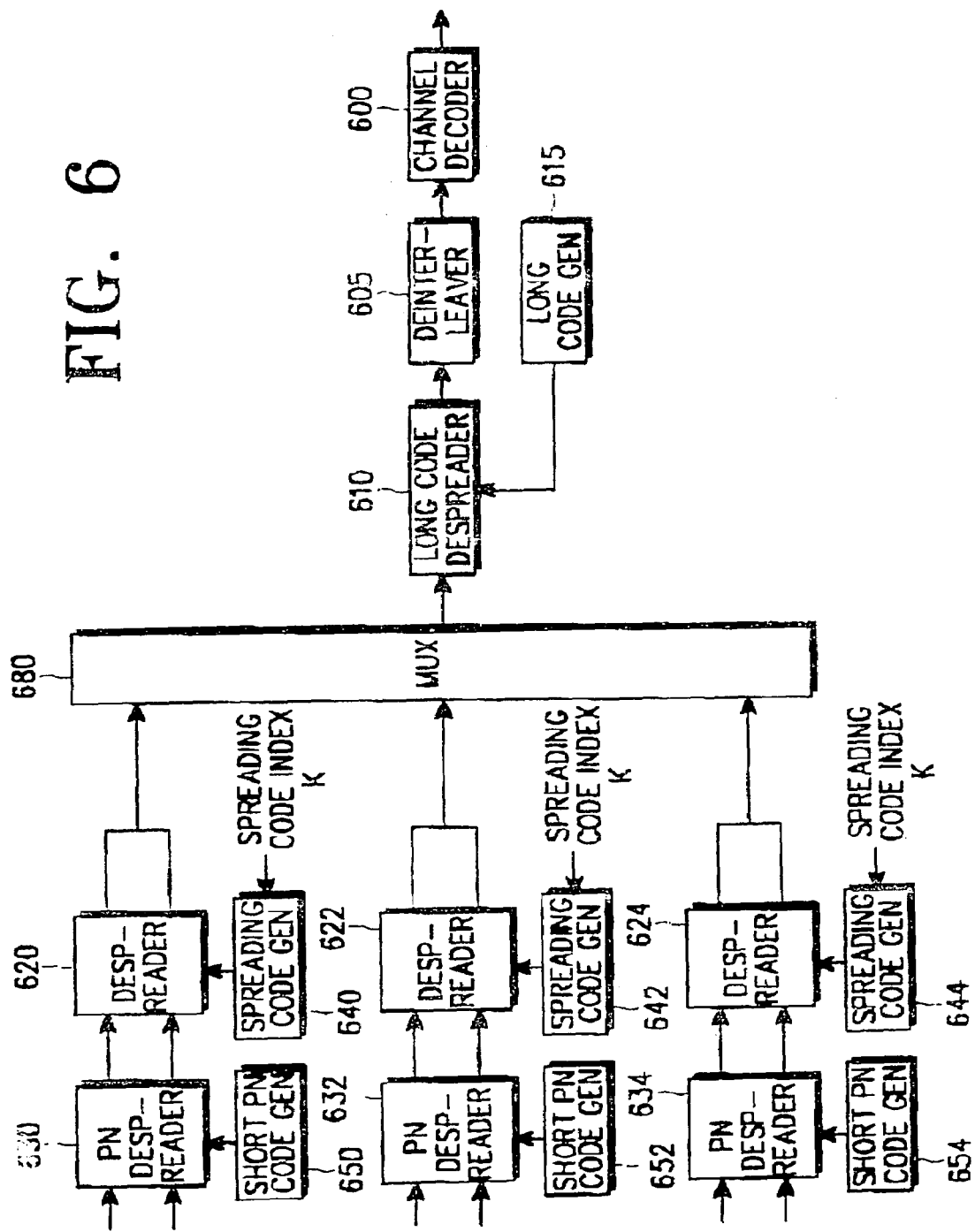
FIG. 6 is a diagram illustrating a receiver in a 3× multi-carrier mobile communication system.

In the first embodiment, the 1× direct spreading system using orthogonal transmit diversity uses the spreading code of length 128, and with regard to the first antenna, the spreading codes output from the rotator 720 of FIG. 7 are shown in FIG. 10B. When the first I and Q component symbols out of the symbols repeated by the symbol repeaters 160 and 162 of FIG. 1 are input to the adders 710 and 715 of FIG. 7, the adder 700 adds a Walsh code of length 128 and a sign component $QOF_{sign}$ of a quasi-orthogonal sequence of length 128 as shown in FIG. 10B, and provides its output to the adders 710 and 715. The adders 710 and 715 add the I and Q component input symbols, respectively, and the output of the adder 700, and provide their output signals to the rotator 720. The rotator 720 then rotates the 128-chip input signals according to the input phase component $QOF_{rot}$ of the quasi-orthogonal code of length 128.

When the second I and Q component symbols out of the symbols repeated by the symbol repeaters 160 and 162 of FIG. 1 are input to the adders 710 and 715 of FIG. 7, the adder 700 adds a Walsh code of length 128 and a sign component $QOF_{sign}$ of a quasi-orthogonal sequence of length 128 as shown in FIG. 10B, and provides its output to the adders 710 and 715. The adders 710 and 715 add the I and Q component input symbols, respectively, and the output of the adder 700, and provide their output signals to the rotator 720. The rotator 720 then rotates the 128-chip input signals according to the input phase component $QOF_{rot}$ of the quasi-orthogonal code of length 128. Referring to FIG. 10B, the first input symbol is added to the Walsh orthogonal code of length 128 and the sign component $QOF_{sign}$ of the quasi-orthogonal code of length 128, and then rotated according to the phase component $QOF_{rot}$ of the quasi-orthogonal code of length 128. Subsequently, in the same manner, the second input symbol is added to the Walsh orthogonal code of length 128 and the sign component $QOF_{sign}$ of the quasi-orthogonal code of length 128, and then rotated according to the phase component $QOF_{rot}$ of the quasi-orthogonal code of length 128.

With regard to the second antenna, the spreading codes output from the rotator 720 of FIG. 7 are shown in FIG. 10C. When the first I and Q component symbols out of the symbols repeated by the symbol repeaters 164 and 166 of FIG. 1 are input to the adders 710 and 715 of FIG. 7, the adder 700 adds a Walsh code of length 128 and a sign component $QOF_{sign}$ of a quasi-orthogonal sequence of length 128 as shown in FIG. 10C, and provides its output to the adders 710 and 715. The adders 710 and 715 then add the I and Q component input symbols, respectively, and the output of the adder 700, and provide their output signals to the rotator 720. The rotator 720 then rotates the 128-chip input signals according to the input phase component $QOF_{rot}$ of the quasi-orthogonal code of length 128.

The second I and Q component symbols out of the symbols repeated by the symbol repeaters 164 and 166 are the inverted symbols obtained by multiplying the first symbols by '−1'. When inverted symbols are input to the adders 710 and 715 of FIG. 7, the adder 700 adds a Walsh code of length 128 and a sign component $QOF_{sign}$ of a quasi-orthogonal sequence of length 128 as shown in FIG. 10C, and provides its output to the adders 710 and 715. The adders 710 and 715 then add the I and Q component input symbols, respectively, and the output of the adder 700, and provide their output signals to the rotator 720. The rotator 720 then rotates the 128-chip input signals according to the input phase component $QOF_{rot}$ of the quasi-orthogonal code of length 128.

Referring to FIG. 10C, the first input symbol out of the symbols repeated by the symbol repeaters 160 and 162 is added to the Walsh orthogonal code of length 128 and the sign component $QOF_{sign}$ of the quasi-orthogonal code of length 128, and then rotated according to the phase component $QOF_{rot}$ of the quasi-orthogonal code of length 128. Subsequently, in the same manner, the second input symbol obtained by inverting the first symbol is added to the Walsh orthogonal code of length 128 and the sign component $QOF_{sign}$ of the quasi-orthogonal code of length 128, and then rotated according to the phase component $QOF_{rot}$ of the quasi-orthogonal code of length 128.

Figure 10D:
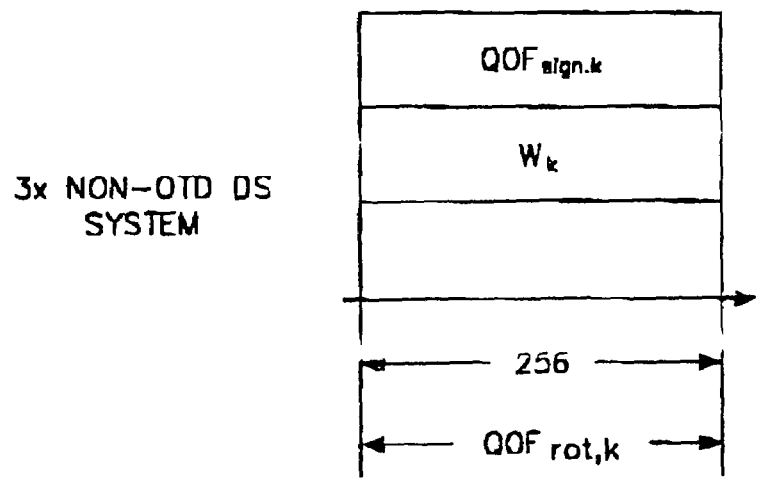
FIG. 10D is a timing diagram explaining the operation of a spreader in a 3× direct spreading system not using orthogonal transmit diversity according to a first embodiment of a present invention.

A description will now be made of spreading operation in the 3× direct spreading system not using orthogonal transmit diversity, with reference to FIGS. 7 and 10D. The 3× direct spreading system not using orthogonal transmit diversity uses spreading codes of length 256, shown in FIG. 10D, output from the rotator 720 of FIG. 7. In FIG. 7, when the I and Q component symbols are input to the adders 710 and 715, the adder 700 adds a Walsh code of length 256 and a sign component $QOF_{sign}$ of a quasi-orthogonal sequence of length 256 as shown in FIG. 10D, and provides its output to the adders 710 and 715. The adders 710 and 715 then add the I and Q component input symbols, respectively, and the output of the adder 700, and provide its output signals to the rotator 720. The rotator 720 then rotates the 256-chip input signals according to the input phase component $QOF_{rot}$ of the quasi-orthogonal code of length 256. Referring to FIG. 10D, one input symbol is added to the Walsh orthogonal code of length 256 and the sign component $QOF_{sign}$ of the quasi-orthogonal code of length 256, and then rotated according to the phase component $QOF_{rot}$ of the quasi-orthogonal code of length 256.

Figure 10E:
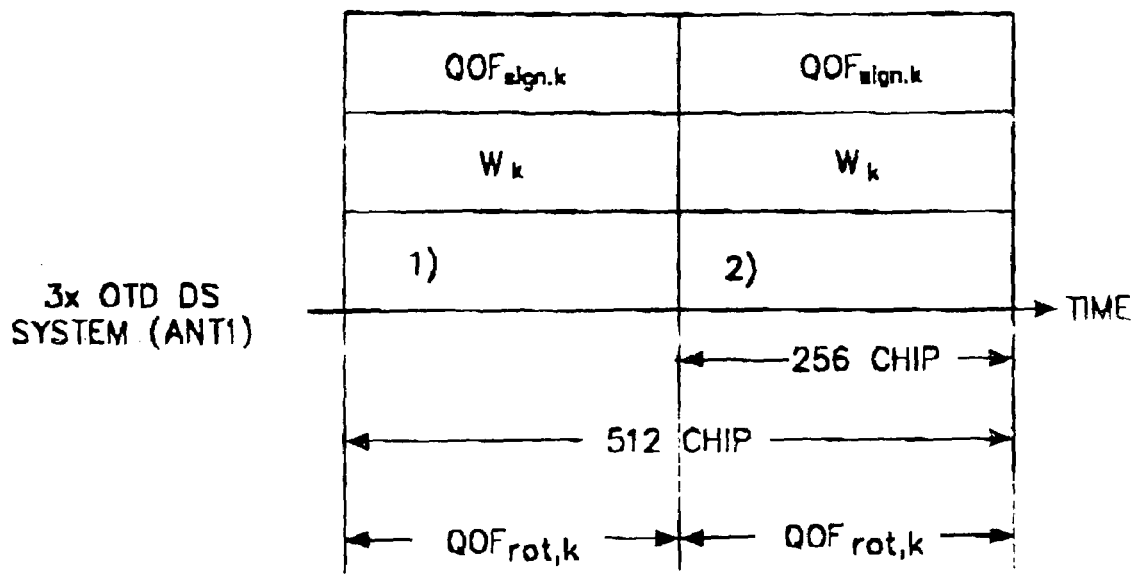
FIG. 10E is a timing diagram explaining the operation of a spreader at a first antenna in the 3× direct spreading system using orthogonal transmit diversity according to a first embodiment of the present invention.
Figure 10F:
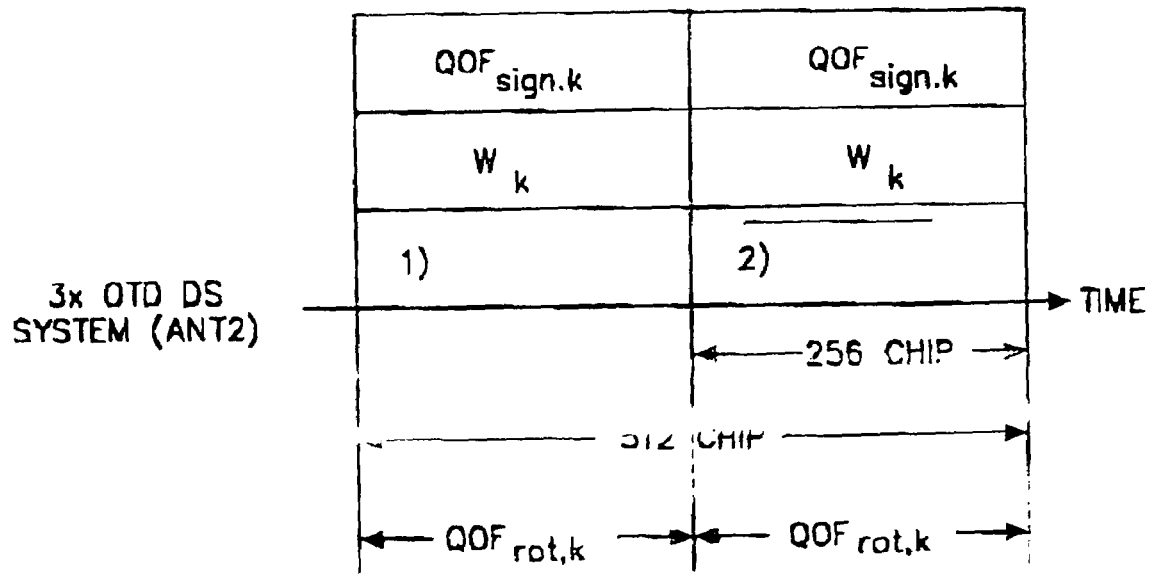
FIG. 10F is a timing diagram explaining the operation of a spreader at a second antenna in the 3× direct spreading system using orthogonal transmit diversity according to a first embodiment of the present invention.

Next, a description will be made of spreading operation in the 3× direct spreading system using orthogonal transmit diversity, with reference to FIGS. 7, 10E and 10F, wherein FIGS. 10E and 10F show the timing diagrams for the first and second antennas, respectively.

In the first embodiment, the 3× direct spreading system using orthogonal transmit diversity uses the spreading code of length 256, and, with regard to the first antenna, the spreading codes output from the rotator 720 of FIG. 7 are shown in FIG. 10E. When the first I and Q component symbols out of the symbols repeated by the symbol repeaters 160 and 162 of FIG. 1 are input to the adders 710 and 715 of FIG. 7, the adder 700 adds a Walsh code of length 256 and a sign component $QOF_{sign}$ of a quasi-orthogonal sequence of length 256 as shown in FIG. 10E, and provides its output to the adders 710 and 715. The adders 710 and 715 add the I and Q component input symbols and the output of the adder 700, and provide their output signals to the rotator 720. The rotator 720 then rotates the 256-chip input signals according to the input phase component $QOF_{rot}$ of the quasi-orthogonal code of length 256.

When the second I and Q component symbols out of the symbols repeated by the symbol repeaters 160 and 162 of FIG. 1 are input to the adders 710 and 715 of FIG. 7, the adder 700 adds a Walsh code of length 256 and a sign component $QOF_{sign}$ of a quasi-orthogonal sequence of length 256 as shown in FIG. 10E, and provides its output to the adders 710 and 715. The adders 710 and 715 add the I and Q component input symbols and the output of the adder 700, and provide their output signals to the rotator 720. The rotator 720 then rotates the 256-chip input signals according to the input phase component $QOF_{rot}$ of the quasi-orthogonal code of length 256. Referring to FIG. 10E, the first input symbol is added to the Walsh orthogonal code of length 256 and the sign component $QOF_{sign}$ of the quasi-orthogonal code of length 256, and then rotated according to the phase component $QOF_{rot}$ of the quasi-orthogonal code of length 256. Subsequently, in the same manner, the second input symbol is added to the Walsh orthogonal code of length 256 and the sign component $QOF_{sign}$ of the quasi-orthogonal code of length 256, and then rotated according to the phase component $QOF_{rot}$ of the quasi-orthogonal code of length 256.

With regard to the second antenna, the spreading codes output from the rotator 720 of FIG. 7 are shown in FIG. 10F. When the first I and Q component symbols out of the symbols repeated by the symbol repeaters 164 and 166 of FIG. 1 are input to the adders 710 and 715 of FIG. 7, the adder 700 adds a Walsh code of length 256 and a sign component $QOF_{sign}$ of a quasi-orthogonal sequence of length 256 as shown in FIG. 10F, and provides its output to the adders 710 and 715. The adders 710 and 715 add the I and Q component input symbols and the output of the adder 700, and provide their output signals to the rotator 720. The rotator 720 then rotates the 256-chip input signals according to the input phase component $QOF_{rot}$ of the quasi-orthogonal code of length 256.

The second I and Q component symbols out of the symbols repeated by the symbol repeaters 164 and 166 are the inverted symbols obtained by multiplying the first symbols by '−1'. When inverted symbols are input to the adders 710 and 715 of FIG. 7, the adder 700 adds a Walsh code of length 256 and a sign component $QOF_{sign}$ of a quasi-orthogonal sequence of length 256 as shown in FIG. 10F, and provides its output to the adders 710 and 715. The adders 710 and 715 add the I and Q component input symbols and the output of the adder 700, and provide their output signals to the rotator 720. The rotator 720 then rotates the 256-chip input signals according to the input phase component $QOF_{rot}$ of the quasi-orthogonal code of length 256.

Referring to FIG. 10F, the first input symbol is added to the Walsh orthogonal code of length 256 and the sign component $QOF_{sign}$ of the quasi-orthogonal code of length 256, and then rotated according to the phase component $QOF_{rot}$ of the quasi-orthogonal code of length 256. Subsequently, in the same manner, the inverted symbol obtained by inverting the first symbol is added to the Walsh orthogonal code of length 256 and the sign component $QOF_{sign}$ of the quasi-orthogonal code of length 256, and then rotated according to the phase component $QOF_{rot}$ of the quasi-orthogonal code of length 256.

Figure 10G:
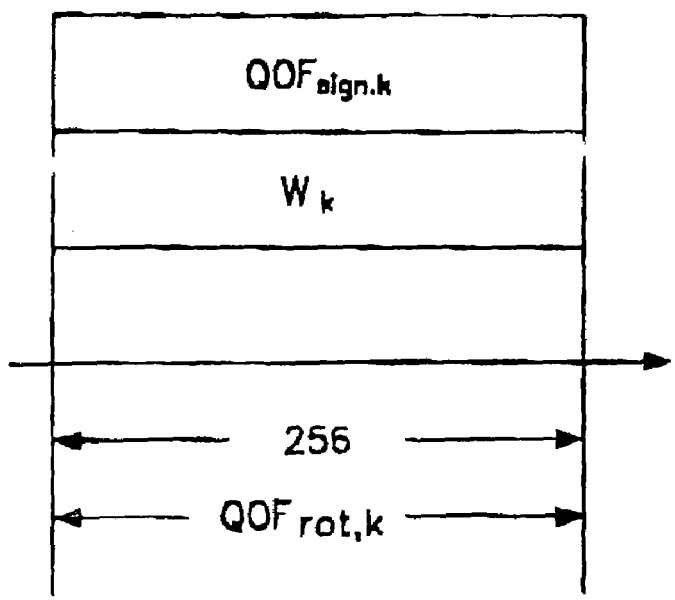
FIG. 10G is a timing diagram explaining the operation of a spreader in a 3× multicarrier system using orthogonal transmit diversity according to a first embodiment of the present invention.

A description will now be made of spreading operation in the 3× multicarrier system with reference to FIGS. 7 and 10G. In the 3× multicarrier system according to the first embodiment, the spreader uses the spreading codes of length 256 for all three carriers, and the spreading codes output from the rotator 720 of FIG. 7 are shown in FIG. 10G.

In FIG. 7, when the I and Q component symbols are input to the adders 710 and 715, the adder 700 adds the Walsh code of length 256 and the sign component $QOF_{sign}$ of the quasi-orthogonal sequence of length 256, and provides its output to the adders 710 and 715. Then, the adders 710 and 715 add the I and Q component symbols, respectively, and the output of the adder 700, and provide their outputs to the rotator 720. The rotator 720 then rotates the 256-chip input signals according to the input phase component $QOF_{rot}$ of the quasi-orthogonal code of length 256. Referring to FIG. 10G, one input symbol is added to the Walsh code of length 256 and the sign component $QOF_{sign}$ of the quasi-orthogonal code of length 256, and then rotated according to the phase component $QOF_{rot}$ of the quasi-orthogonal code of length 256.

B. Second Embodiment

In the second embodiment, the 1× direct spreading system uses the quasi-orthogonal codes of length 256, the 3× direct spreading system uses the quasi-orthogonal codes of length 256, and the 3× multicarrier system uses the quasi-orthogonal codes of length 256.

First, a description will be made of spreading operation in the 1× direct spreading system not using orthogonal transmit diversity, with reference to FIGS. 7 and 11A. The 1× non-OTD direct spreading system according to the second embodiment uses quasi-orthogonal spreading codes of length 256, and the spreading codes output from the rotator 720 of FIG. 7 are shown in FIG 11A.

Figure 11A:
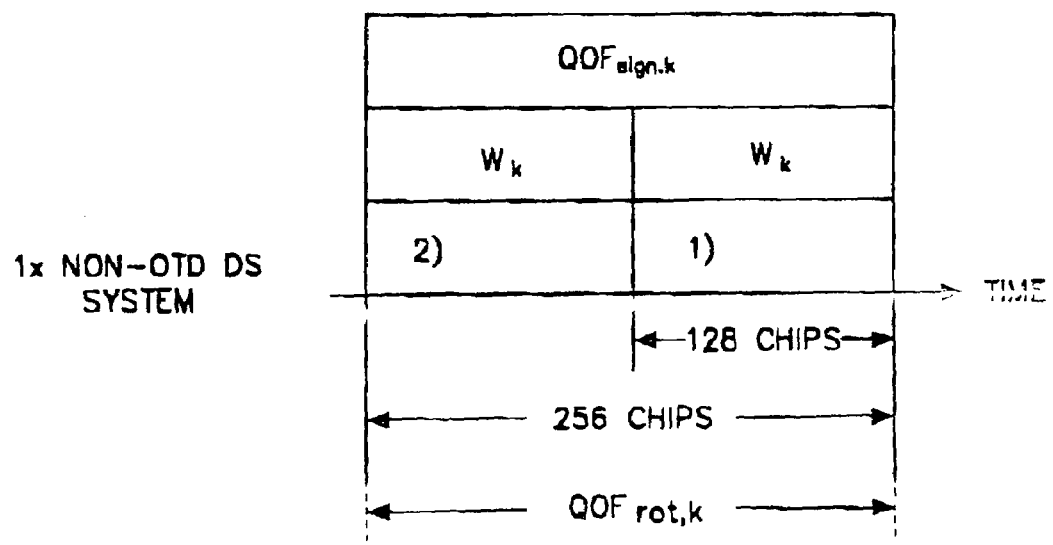
FIG. 11A is a timing diagram explaining the operation of a spreader in the 1× direct spreading system not using orthogonal transmit diversity according to a second embodiment of the present invention.

In FIG. 7, when the I and Q component symbols are input to the adders 710 and 715, the adder 700 adds the Walsh code of length 128 and the leading 128-chip portion of the sign component $QOF_{sign}$ of the quasi-orthogonal sequence of length 256, as shown in FIG. 11A, and provides the added signals to the adders 710 and 715. The adders 710 and 715 then add the I and Q component symbols to the signals output from the adder 700, and provide the added signals to the rotator 720. The rotator 720 then rotates the 128-chip input signals according to the leading 128-chip portion of the input phase component $QOF_{rot}$ of the quasi-orthogonal code of length 256. After this process, when the next I and Q component symbols are input to the adders 710 and 715, the adder 700 adds the Walsh code of length 128 and the following 128-chip portion of the sign component $QOF_{sign}$ of the quasi-orthogonal sequence of length 256, as shown in FIG. 11A, and provides the added signals to the adders 710 and 715. The adders 710 and 715 then add the I and Q component symbols to the signals output from the adder 700, and provide the added signals to the rotator 720. The rotator 720 then rotates the 128-chip input signals according to the following 128-chip portion of the input phase component $QOF_{rot}$ of the quasi-orthogonal code of length 256.

Referring to FIG. 11A, one input symbol is added to the leading 128-chip portion of the Walsh code of length 128 and the leading 128-chip portion of the sign component $QOF_{sign}$ of the quasi-orthogonal code of length 256, and then rotated according to the leading 128-chip portion of the phase component $QOF_{rot}$ of the quasi-orthogonal code of length 256. Subsequently, the next input symbol is added to the Walsh code of length 128 and the following 128-chip portion of the sign component $QOF_{sign}$ of the quasi-orthogonal code of length 256, and then rotated according to the following 128-chip portion of the phase component $QOF_{rot}$ of the quasi-orthogonal code of length 256.

Figure 11B:
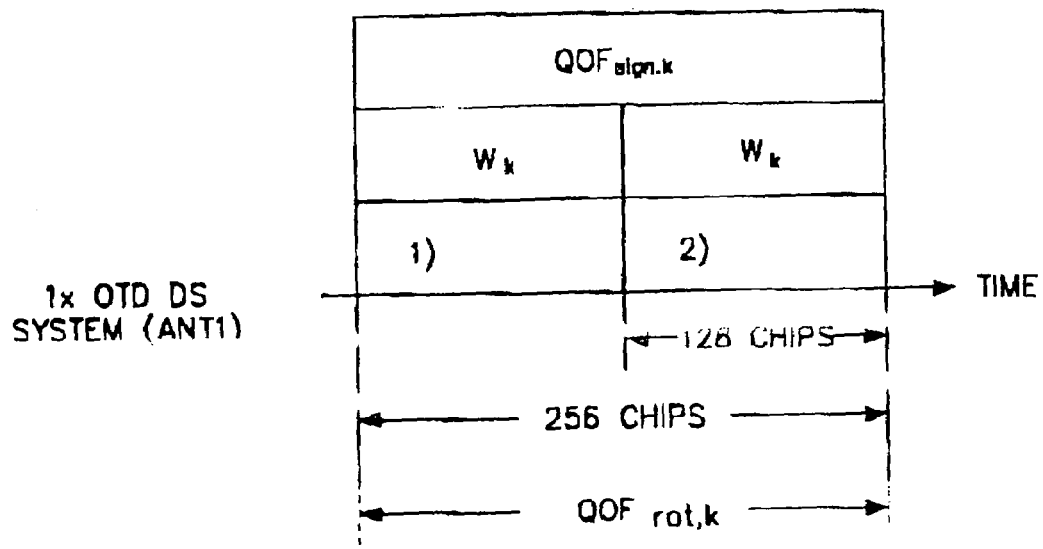
FIG. 11B is a timing diagram explaining the operation of a spreader at a first antenna in the 1× direct spreading system using orthogonal transmit diversity according to a second embodiment of the present invention.
Figure 11C:
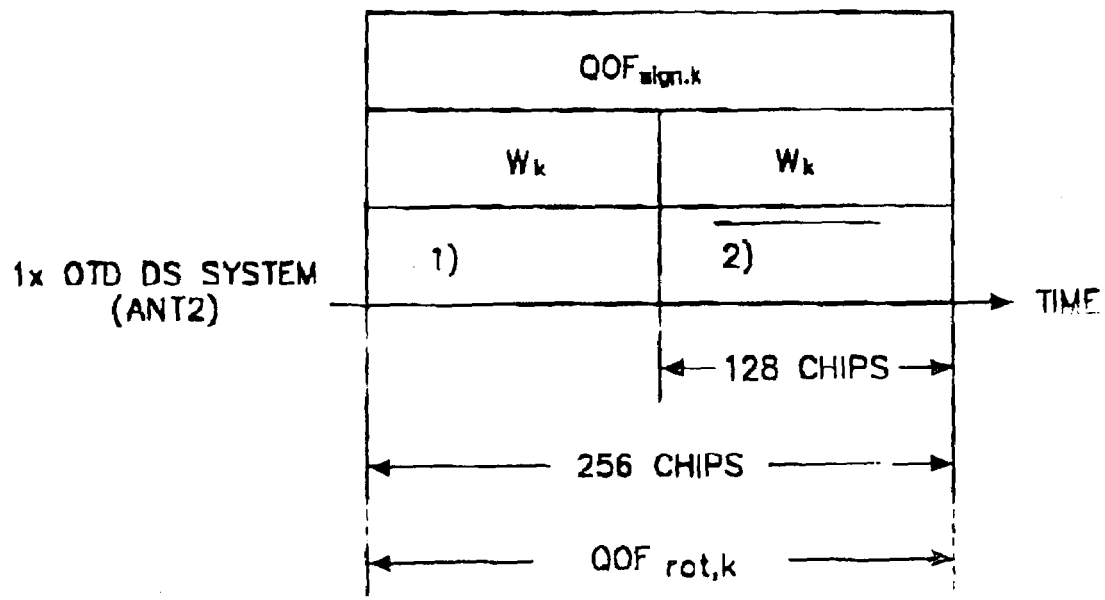
FIG. 11C is a timing diagram explaining the operation of a spreader at a second antenna in the 1× direct spreading system using orthogonal transmit diversity according to a second embodiment of the present invention.

Next, a description will be made of spreading operation in the 1× OTD direct spreading system, with reference to FIGS. 7, 11B and 11C, wherein FIG. 11B shows a timing diagram for the first antenna and FIG. 11C shows a timing diagram for the second antenna. The 1× OTD direct spreading system according to the second embodiment uses the quasi-orthogonal spreading codes of length 256, and the spreading codes output from the rotator 720 of FIG. 7 are shown in FIG. 11B.

In FIG. 7, when the first I and Q component symbols out of the symbols repeated by the symbol repeaters 160 and 162 of FIG. 1 are input to the adders 710 and 715, the adder 700 adds the Walsh code of length 128 and the leading 128-chip portion of the sign component $QOF_{sign}$ of the quasi-orthogonal sequence of length 256, as shown in FIG. 11B, and provides the added signals to the adders 710 and 715. The adders 710 and 715 then add the I and Q component symbols to the signals output from the adder 700, and provide the added signals to the rotator 720. The rotator 720 then rotates the 128-chip input signals according to the leading 128-chip portion of the input phase component $QOF_{rot}$ of the quasi-orthogonal code of length 256. Thereafter, when the second I and Q component symbols out of the symbols repeated by the symbol repeaters 160 and 162 of FIG. 1 are input to the adders 710 and 715, the adder 700 adds the Walsh code of length 128 and the following 128-chip portion of the sign component $QOF_{sign}$ of the quasi-orthogonal sequence of length 256, as shown in FIG. 11B, and provides the added signals to the adders 710 and 715. The adders 710 and 715 then add the I and Q component symbols to the signals output from the adder 700, and provide the added signals to the rotator 720. The rotator 720 then rotates the 128-chip input signals according to the following 128-chip portion of the input phase component $QOF_{rot}$ of the quasi-orthogonal code of length 256.

Referring to FIG. 11B, the first input symbol out of the symbols repeated by the symbol repeaters 160 and 162 of FIG. 1 is added to the Walsh code of length 128 and the leading 128-chip portion of the sign component $QOF_{sign}$ of the quasi-orthogonal code of length 256, and then rotated according to the leading 128-chip portion of the phase component $QOF_{rot}$ of the quasi-orthogonal code of length 256. Subsequently, in the same manner, the second input symbol is added to the Walsh code of length 128 and the following 128-chip portion of the sign component $QOF_{sign}$ of the quasi-orthogonal code of length 256, and then rotated according to the following 128-chip portion of the phase component $QOF_{rot}$ of the quasi-orthogonal code of length 256.

With regard to the second antenna, the spreading codes output from the rotator 720 of FIG. 7 are shown in FIG. 11C. When the first I and Q component symbols out of the symbols repeated by the symbol repeaters 164 and 166 of FIG. 1 are input to the adders 710 and 715, the adder 700 adds the Walsh code of length 128 and the leading 128-chip portion of the sign component $QOF_{sign}$ of the quasi-orthogonal sequence of length 256, as shown in FIG. 11C, and provides the added signals to the adders 710 and 715. The adders 710 and 715 then add the I and Q component symbols to the signals output from the adder 700, and provide the added signals to the rotator 720. The rotator 720 then rotates the 128-chip input signals according to the leading 128-chip portion of the input phase component $QOF_{rot}$ of the quasi-orthogonal code of length 256.

The second I and. Q component symbols out of the symbols repeated by the symbol repeaters 164 and 166 of FIG. 1 are inverted symbols obtained by inverting the first I and Q component symbols. When the inverted symbols are input to the adders 710 and 715, the adder 700 adds the Walsh code of length 128 and the following 128-chip portion of the sign component $QOF_{sign}$ of the quasi-orthogonal sequence of length 256, as shown in FIG. 11C, and provides the added signals to the adders 710 and 715. The adders 710 and 715 then add the I and Q component symbols to the signals output from the adder 700, and provide the added signals to the rotator 720. The rotator 720 then rotates the 128-chip input signals according to the following 128-chip portion of the input phase component $QOF_{rot}$ of the quasi-orthogonal code of length 256.

Referring to FIG. 11C, the first input symbol out of the symbols repeated by the symbol repeaters 164 and 166 of FIG. 1 is added to the Walsh code of length 128 and the leading 128-chip portion of the sign component $QOF_{sign}$ of the quasi-orthogonal code of length 256, and then rotated according to the leading 128-chip portion of the phase component $QOF_{rot}$ of the quasi-orthogonal code of length 256. Subsequently, in the same manner, the second input symbol obtained by inverting the first input symbol is added to the Walsh code of length 128 and the following 128-chip portion of the sign component $QOF_{sign}$ of the quasi-orthogonal code of length 256, and then rotated according to the following 128-chip portion of the phase component $QOF_{rot}$ of the quasi-orthogonal code of length 256.

Further, a description will be made of spreading operation in the 3× non-OTD direct spreading system, with reference to FIGS. 7 and 11D. The 3× non-OTD direct spreading system according to the second embodiment uses the quasi-orthogonal spreading codes of length 256, and the spreading codes output from the rotator 720 of FIG. 7 are shown in FIG. 11D.

Figure 11D:
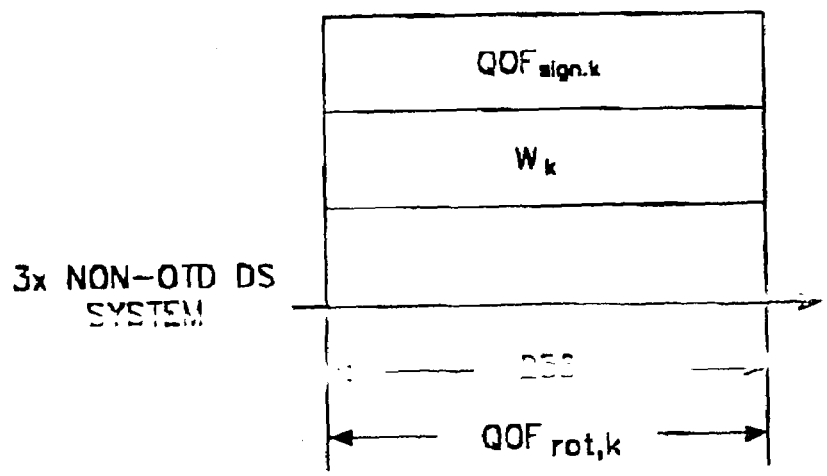
FIG. 11D is a timing diagram explaining the operation of a spreader in the 3× direct spreading system not using orthogonal transmit diversity according to a second embodiment of the present invention.

In FIG. 7, when the I and Q component symbols are input to the adders 710 and 715, the adder 700 adds the Walsh code of length 256 and the sign component $QOF_{sign}$ of the quasi-orthogonal sequence of length 256, as shown in FIG. 11D, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the input phase component $QOF_{rot}$ of the quasi-orthogonal code of length 256. Referring to FIG. 11D, one input symbol is added to the Walsh code of length 256 and the sign component $QOF_{sign}$ of the quasi-orthogonal code of length 256, and then rotated according to the phase component $QOF_{rot}$ of the quasi-orthogonal code of length 256.

Figure 11E:
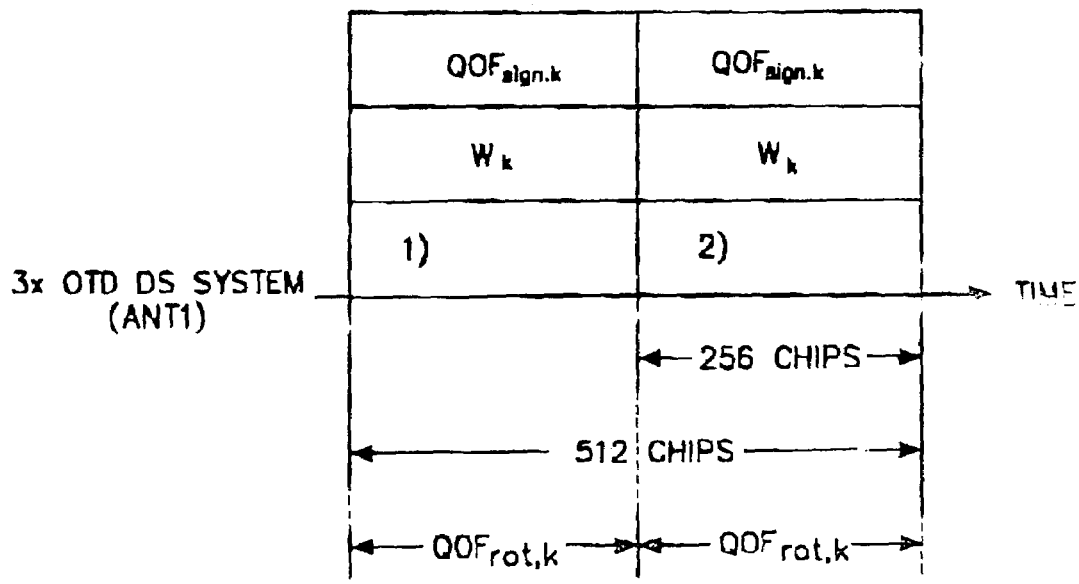
FIG. 11E is a timing diagram explaining the operation of a spreader at a first antenna in the 3× direct spreading system using orthogonal transmit diversity according to a second embodiment of the present invention.
Figure 11F:
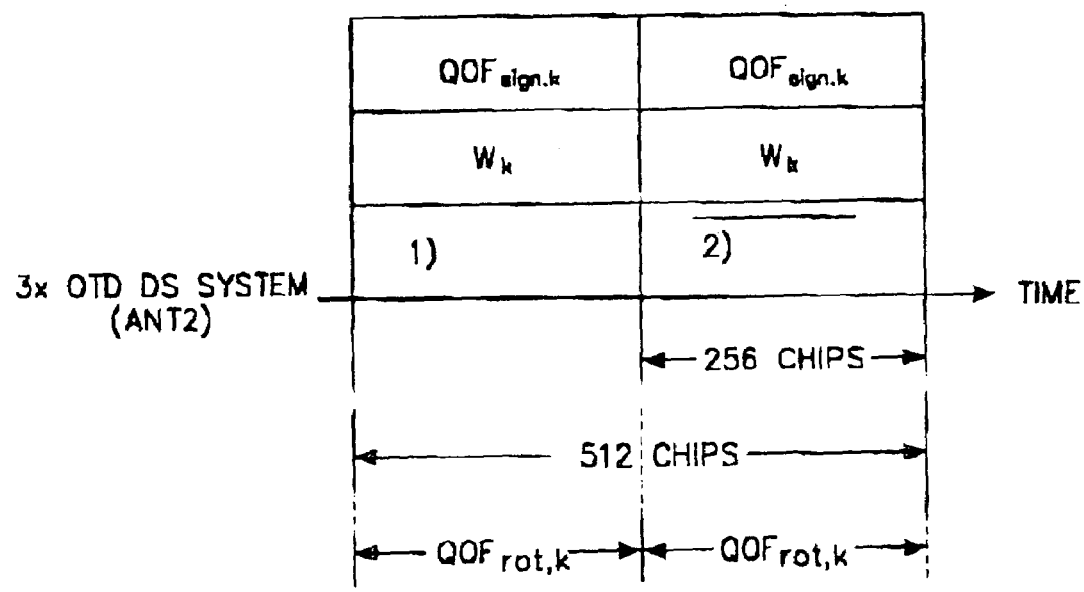
FIG. 11F is a timing diagram explaining the operation of a spreader at a second antenna in the 3× direct spreading system using orthogonal transmit diversity according to a second embodiment of the present invention.

Next, a description will be made of spreading operation in the 3× OTD direct spreading system with reference to FIGS. 7, 11E and 11F, wherein FIG. 11E shows a timing diagram of the first antenna and FIG. 11F shows a timing diagram of the second antenna.

The 3× OTD direct spreading system according to the second embodiment uses the spreading codes of length 256, and with regard to the first antenna, the spreading codes output from the rotator 720 of FIG. 7 are shown in FIG. 11E. When the I and Q component symbols out of the symbols repeated by the symbol repeaters 160 and 162 of FIG. 1 are input to the adders 710 and 715, the adder 700 adds the Walsh code of length 256 and the sign component $QOF_{sign}$ of the quasi-orthogonal sequence of length 256, as shown in FIG. 1E, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the input phase component $QOF_{rot}$ of the quasi-orthogonal code of length 256.

When the second I and Q component symbols out of the symbols repeated by the symbol repeaters 160 and 162 of FIG. 1 are input to the adders 710 and 715, the adder 700 adds the Walsh code of length 256 and the sign component $QOF_{sign}$ of the quasi-orthogonal sequence of length 256, as shown in FIG. 11E, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the input phase component $QOF_{rot}$ of the quasi-orthogonal code of length 256.

Referring to FIG. 11E, the first input symbol out of the symbols repeated by the symbol repeaters 160 and 162 of FIG. 1 is added to the Walsh code of length 256 and the sign component $QOF_{sign}$ of the quasi-orthogonal code of length 256, and then rotated according to the phase component $QOF_{rot}$ of the quasi-orthogonal code of length 256. Subsequently, in the same manner, the second input symbol is added to the Walsh code of length 256 and the sign component $QOF_{sign}$ of the quasi-orthogonal code of length 256, and then rotated according to the phase component $QOF_{rot}$ of the quasi-orthogonal code of length 256.

With regard to the second antenna, the spreading codes output from the rotator 720 of FIG. 7 are shown in FIG. 11F. When the I and Q component symbols out of the symbols repeated by the symbol repeaters 164 and 166 of FIG. 1 are input to the adders 710 and 715, respectively, the adder 700 adds the Walsh code of length 256 and the sign component $QOF_{sign}$ of the quasi-orthogonal sequence of length 256, as shown in FIG. 11F, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the input phase component $QOF_{rot}$ of the quasi-orthogonal code of length 256.

The second I and Q symbols out of the symbols repeated by the symbol repeaters 164 and 166 are the inverted symbols obtained by inverting the first symbols. When the inverted symbols are input to the adders 710 and 715, respectively, the adder 700 adds the Walsh code of length 256 and the sign component $QOF_{sign}$ of the quasi-orthogonal sequence of length 256, as shown in FIG. 11F, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the input phase component $QOF_{rot}$ of the quasi-orthogonal code of length 256.

Referring to FIG. 11F, the first input symbols out of the symbols repeated by the symbol repeaters 164 and 166 of FIG. 1 are added to the Walsh code of length 256 and the sign component $QOF_{sign}$ of the quasi-orthogonal code of length 256, and then rotated according to the phase component $QOF_{rot}$ of the quasi-orthogonal code of length 256. Subsequently, in the same manner, the second input symbols obtained by inverting the first symbols are added to the Walsh code of length 256 and the sign component $QOF_{sign}$ of the quasi-orthogonal code of length 256, and then rotated according to the phase component $QOF_{rot}$ of the quasi-orthogonal code of length 256.

Next, a description will be made of spreading operation in the 3× multicarrier system, with reference to FIGS. 7 and 11G. The 3× multicarrier system according to the second embodiment uses the spreading codes of length 256 for all the three carriers. The spreading codes output from the rotator 720 of FIG. 7 are shown in FIG. 11G.

Figure 11G:
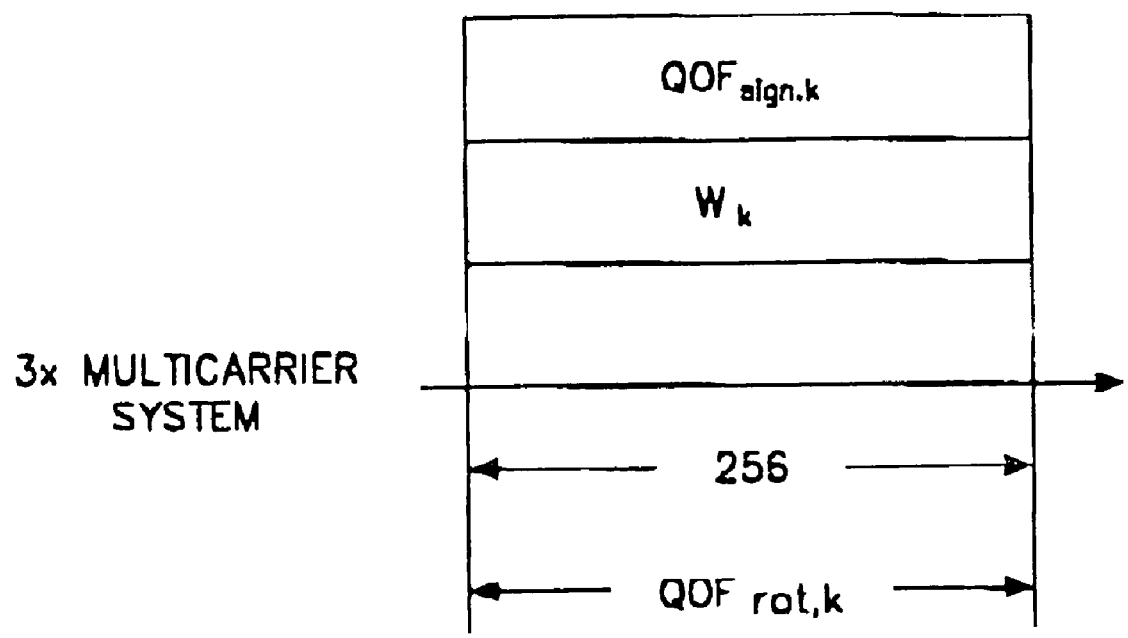
FIG. 11G is a timing diagram explaining the operation of a spreader in the 3× multicarrier system using orthogonal transmit diversity according to a second embodiment of the present invention.

When the I and Q component symbols are input to the adders 710 and 715, the adder 700 adds the Walsh code of length 256 and the sign component $QOF_{sign}$ of the quasi-orthogonal sequence of length 256, as shown in FIG. 11G, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the input phase component $QOF_{rot}$ of the quasi-orthogonal code of length 256.

Referring to FIG. 11G, one input symbol is added to the Walsh code of length 256 and the sign component $QOF_{sign}$ of the quasi-orthogonal code of length 256, and then rotated according to the phase component $QOF_{rot}$ of the quasi-orthogonal code of length 256.

C. Third Embodiment

In the third embodiment, the 1× direct spreading system uses the quasi-orthogonal codes of length 256, the 3× direct spreading system uses the quasi-orthogonal codes of length 512, and the 3× multicarrier system uses the quasi-orthogonal codes of length 256.

The 3× direct spreading system according to the third embodiment requires a mask function of length 512. In this context, the quasi-orthogonal sequences should have (1) a good full correlation property with the Walsh orthogonal codes, (2) a good full correlation property between the quasi-orthogonal codes, and (3) a good partial correlation property with the Walsh orthogonal codes, as disclosed in Korean patent application Nos. 99-888 and 99-1339, filed by the applicant. In addition, they should have a good partial correlation property between the quasi-orthogonal codes. The invention provides quasi-orthogonal codes that satisfy the above conditions.

Tables below show quasi-orthogonal sequence masks of length 512. More specifically, Tables 1 and 3 show the quasi-orthogonal codes expressed in quaternary values, satisfying the above conditions, wherein '0' indicates '1', '1' indicates 'j', '2' indicates '−1' and '3' indicates '−j'. Further, Tables 2 and 4 show the quasi-orthogonal codes expressed in polar coordinates comprised of the sign component $QOF_{sign}$ and the phase component $QOF_{rot}$, wherein the phase component is equal to a specific Walsh code. Therefore, the respective signals are represented by $W_i$.

TABLE 1

$f(x) = 1 + x^1 + x^2 + x^4 + x^5 + x^7 + x^9$
$g(x) = 3 + 3x^1 + x^2 + x^4 + 3x^5 + 2x^6 + 3x^7 + 2x^8 + x^9$ e1: 02113122221333021300021111202213003111202033130011202213130002111
1322023311022231023331002231332011022231132202330013110220111322
3122021111200031021113000031330233022213130020330031330202111300
2011310022311021322201133202231223111022011310011020013310002333
2213112002111300330222133122021102111300221311201300203311200031
1102001313222011001333202011310031000233332022312011310000133320
3302003113000211003111200211312213000211330200312033130022133302
0013110202333100332000131322023320111322223133201322023333200013 e2: 02223331311122202022113113110020333102222220311133130200220231330
2222333131112220202211311311002011320000000213331131202200201311
1311220202001131133322200222111322021311113102000002311133312000
3133002020223313311100022000333122021311113102000002311133312000
0002311111130222002031331131020013332220200033313133002002001131
2220133333312000220213113313202213332220200033313133002002001131
3313020000201311111320002220311120221131313322022000111331112220
3313020000201311111320002220311110200331313110020022233311333 0002 e3: 01303023233012231201013030012330100303321021031021101003213210 21
3203031032210332031010210332100301122232312302312232330302301 30
0332100303101021322103323203031012012312300101120130120123303 001
1223011230232312011230012312120121321021211010031021031010030 332
1003211032030310033210032132320301301201011212233023013030010112
2330122323121201122301121201013010210310322121100310320321101003
1201013012230112231212012330122303323222121321021100303323203 2132
0310102121103221102121323221033230010112302301300112122301301201 e4: 01213010232112103032232112320121121001031232012101213100010 33032
10302101323003012123323003231030030110120323103010302101101 22123
0103303223031232301023031210010330102303303232212321121023 031232
3230030110302101032310302123323003231030030110121012212310 302101
2101103003013230323021231030032310120301130032321011030212 31012
3010012112102321232130320121123201031210012112323010012130 32 0103
2123101203233212321221011012030132122101323021230301323003 23 3212
1210232130100121012112322321303201211232010312103032010330 100121

TABLE 2

$f(x) = 1 + x^1 + x^2 + x^4 + x^5 + x^7 + x^9$
$g(x) = 3 + 3x^1 + x^2 + x^4 + 3x^5 + 2x^6 + 3x^7 + 2x^8 + x^9$
Sign: 01001011110111101010001000010110100100010101101000010110101000100
0111011100011110011110001101110000111100111011100010001110000111
1011010000100010010001000010110111011101010010010110010110101000100

TABLE 2-continued

```
       1000100011000010111100011101110111000011000100000001000110000111
       1101001001000100110111011011010000100010011010010010010100100010
       0001000101111000001111010001000100001111110111010001000000011110
       1101001001000100001000100100101101000100110100101011010011011101
       0001000101111000111000010111011110000111111011100111011111100001
rot:   W214
Sign:  0111111010001110101100100100001011100111111010001101010011011011
       0111111010001110101100100100001000011000000101110010101100100100
       0100110101000010011111100111000111010100001001000001100011101000
       1011001010111011000000110011101101010000100100000110001110100
       0001100000010111001010110010010001111110100011101011001001000010
       1110011111101000110101001101101101111101000111010110010010000010
       1101010000100100000110001110100010110010101111011000000110001110
       1101010000100100000110001110100010011010100001001111110011100001
rot:   W172
Sign:  0010101111100111010000101000111000001011100100100100000110110010
       1101010011001110100000100111000100001011111011011011111110110010
       0111000101000010111001111101010000100110110000001001001011101000
       0111000110111010001100011010100101100101000001000100000010111
       0001100011010100011100011011110100100100000101111011001010000001
       1110011111010100011100010100010000100100111010000100110110000001
       0100001001110001110100110011101111110101100100010001011111011011
       010000101000111000101011110011110000001101100100000101110010100
rot:   W375
Sign:  0010100011100100101111100111001001000001011100100010100000011011
       0010100011100100101111100111001001000001011100100010100000011011
       0001101111010101110001101010000011000110110111101110010011010111
       1110010000101000011100101011110011100100100000100011010010100
       10000010010011011101010010010011100010100001001110000010100110001
       10000010010011011101010010010011100010100001001110000010100110001
       101100010111101110110000001010011011000111010110100111001111101
       010011101000010001001111101011001001110001010010110001000010
Rot:   W117
```

TABLE 3

$f(x) = 1 + x^2 + x^3 + x^5 + x^6 + x^8 + x^9$
$g(x) = 3 + 2x^1 + 3x^2 + 3x^3 + 2x^4 + 3x^5 + x^6 + 3x^8 + x^9$

```
e1:    0121103021231210210112322321323010120103123221013032030110300121
       1210030110302303101223213010210121013010010332302303103021233032
       3230232130100323121021233212230323033212030130320323301001031012
       2101301001033230230310302123303212100301103023031012232130102101
       1210030110302303101223213010210101032312322321101201213212030110
       0121103021231210210112322321323032302321310100323121021233212203
       0323123223211012012132120301121012100301103023031012232130102101
       1012010312322101303203011030012123032312030130320323301001031012
e2:    0222313311312220200013111131222031330222222011313133022200023313
       0020111313330200002011133111202233312202202231111113002020223111
       3111020022021113311102000020333102003111111322020221333111332202
       3313222020003133113100022000313300021131311022200022113131332000
       2000313333132220200031331310002131102220002113131332000000021131
       22021113311102000020333131110200111322020200031111113220220221333
       3111202222023331133302002202333102001333111300200200133333312202
       3313000220001311331300020222313300023313131120002220113113112000
e3:    0222313311312220200013111131222031330222222011313133022200023313
       31221102023322132011221313001102023322133122110231223320023330031
       001320333302132230231000013021111203100223102110013021133023100
       11023122003120112213201133203122003120111102312211021230003123
       31003302203322310211223113223302203322313100330231001120203330013
       2011221313001102130033202011003131223320023300312011003113003320
       3302310000130211223102111120310000103021133023100330213220013203
       003102331102130011023122003120113320312222132011003120111023122
e4:    013023303023122330233001013001120310033210211003102132210310211
       2312011230231223302330012312233003100332303322130310303102110
       0130011212011223120130010130233003102110320310033203322103100332
       2312233012011223120130012312011203102110102132211021100303100332
       10211003213221100310211032031003302312232310211201301121201123
       32033222121322110031021101021322130232122301302230323122330120111223
       10212221031021102132211032033221302330010130011223120112120113001
       32031003031021102132211101021100330233300123122330013023301201301
```

TABLE 4

$f(x) = 1 + x^2 + x^3 + + x^5 + x^6 + x^8 + x^9$
$g(x) = 3 + 2x^1 + 3x^2 + 3x^3 + 2x^4 + 3x^5 + x^6 + 3x^8 + x^9$

Sign: 0010001010110100100001111110111000010001011110001011010000100010
0100010000101101000111101000100010001000000011110110100101011011
1110111010000111010010111101110111011101010010110111100000010001
1000100000011110110100101011101010001000010110100011110100001000
0100010000101101000111101000100001110111111000010010110101000100
0010001010110100100001111110111011101111010000111010010111011101
0111011111100001001011101010001000100010000101101000111110100001000
0001000101111000101101000010001011101110101001011011111000000010001
rot: W485
Sign: 0111101100101110100001000010111010101011111100010101101110011101
0010000101110100001000011000101111101101101110000001001010111000
1000010011010001100001000010111001001000000111011011011100011101
1101111010001011001000011000101100010010010001110001001010111000
1000101111011101000101100100001010001110001001010111110000001001
1101000110000100001011101000010000011101010010000001110110110111
1000101111011110011101001011110010000111000100100100011111101101
1101000110000100110100010111101110001110101001000111000100101000
rot: W172
Sign: 0100111001111101011100100100000110000010101110001010000101110010
1011000101111101100110101000010111101101110011011111001110010
0001101111010111110110000001010000101000111001000001010011011000
0001101100010000101100011110011001010000000101100010110000100111
1000110110111110001100111101101111101000110110000010101110001
1000110101000001010011101000001010111100011100101000000101110
1101100000010100111100100001010000010100110110001101011100011011
0010011100010100000110110010100011101011110110000010100000011011
rot: W378
Sign: 0010111010110111101110000100000101000110010000100101110010010
1101000110110111101110001101111001000111111011110110100010010100
0010000101000111010010000101110010010001101000111011110010001011
1101111001000111010001000101000000100000101110001000010010001011
0010000110111000010010011010001101101111101000100100000101000111
1101111010111000010010000010101101011101100101101101101110010001
0010111010001001011100011011110101100000100001101000100101001000
1101000101001000101110000100001101110001101110010111100101110010
rot: W283

First, a description will be made of spreading operation in the 1× non-OTD direct sp reading system, with reference to FIGS. 7 and 12A. The 1× non-OTD direct spreading system according to the third embodiment uses the quasi-orthogonal spreading codes of length 256, and the spreading codes output from the rotator 720 of FIG. 7 are shown in FIG. 12A.

Figure 12A:
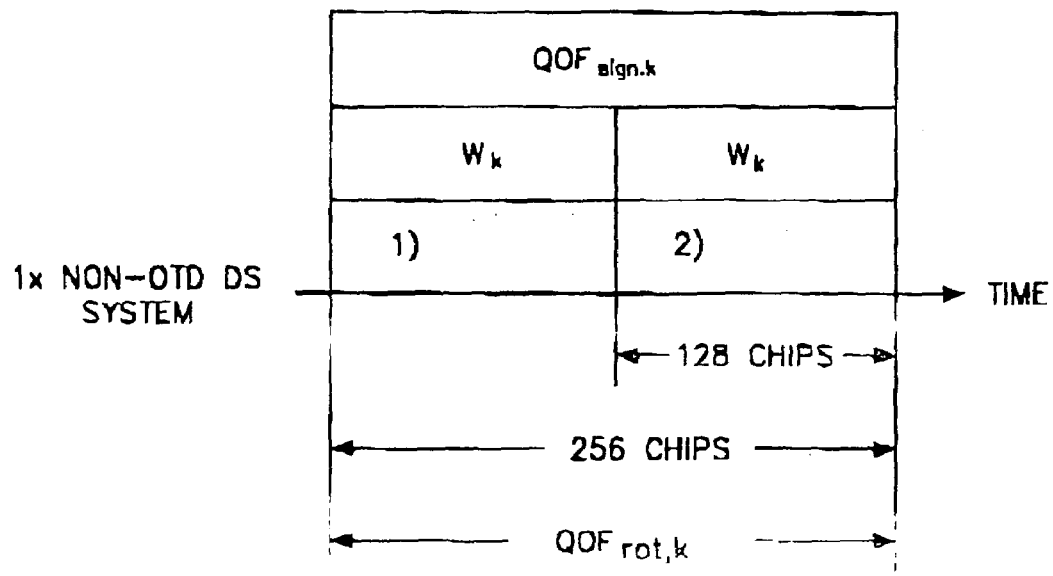
FIG. 12A is a timing diagram explaining the operation of a spreader in the 1× direct spreading system not using orthogonal transmit diversity according to a third embodiment of the present invention.

In FIG. 7, when the I and Q component symbols are input to the adders 710 and 715, the adder 700 adds the Walsh code of length 128 and the leading 128-chip portion of the sign component $QOF_{sign}$ of the quasi-orthogonal sequence of length 256, as shown in FIG. 12A, and provides the added signals to the adders 710 and 715. The adders 710 and 715 then add the I and Q component symbols, respectively, to the signals output from the adder 700, and provide the added signals to the rotator 720. The rotator 720 then rotates the 128-chip input signals according to the leading 128-chip portion of the input phase component $QOF_{rot}$ of the quasi-orthogonal code of length 256. After this process, when the next I and Q component symbols are input to the adders 710 and 715, the adder 700 adds the Walsh code of length 128 and the following 128-chip portion of the sign component $QOF_{sign}$ of the quasi-orthogonal sequence of length 256, as shown in FIG. 12A, and provides the added signals to the adders 710 and 715. The adders 710 and 715 then add the I and Q component symbols, respectively, to the signals output from the adder 700, and provide the added signals to the rotator 720. The rotator 720 then rotates the 128-chip input signals according to the following 128-chip portion of the input phase component $QOF_{rot}$ of the quasi-orthogonal code of length 256.

Referring to FIG. 12A, one input symbol is added to the Walsh code of length 128 and the leading 128-chip portion of the sign component $QOF_{sign}$ of the quasi-orthogonal code of length 256, and then rotated according to the leading 128-chip portion of the phase component $QOF_{rot}$ of the quasi-orthogonal code of length 256. Subsequently, in the same manner, the next input symbol is added to the Walsh code of length 128 and the following 128-chip portion of the sign component $QOF_{sign}$ of the quasi-orthogonal code of length 256, and then rotated according to the following 128-portion of the phase component $QOF_{rot}$ of the quasi-orthogonal code of length 256.

Figure 12B:
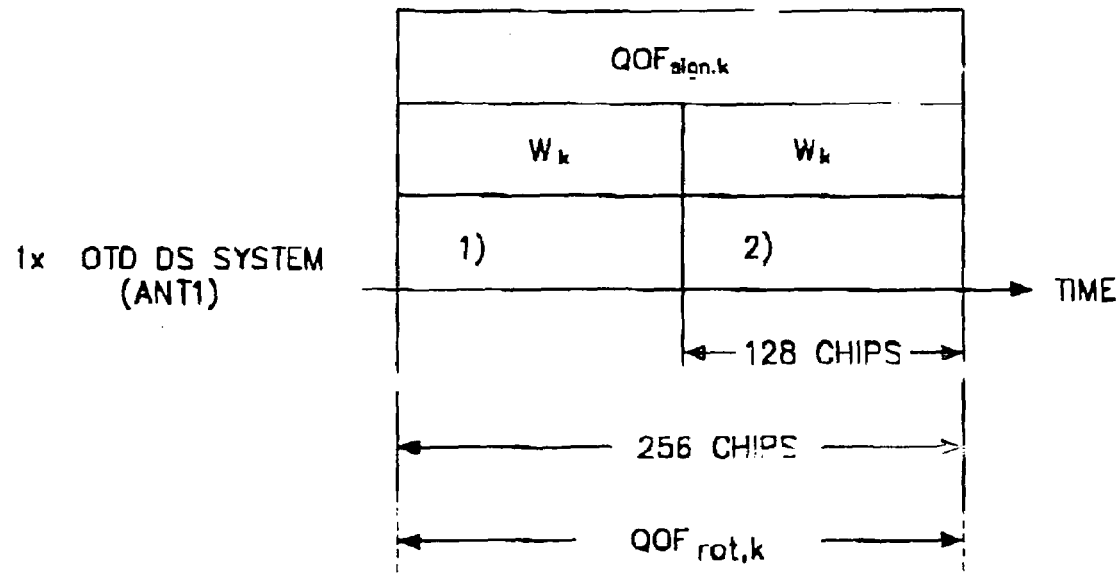
FIG. 12B is a timing diagram explaining the operation of a spreader at a first antenna in the 1× direct spreading system using orthogonal transmit diversity according to a third embodiment of the present invention.
Figure 12C:
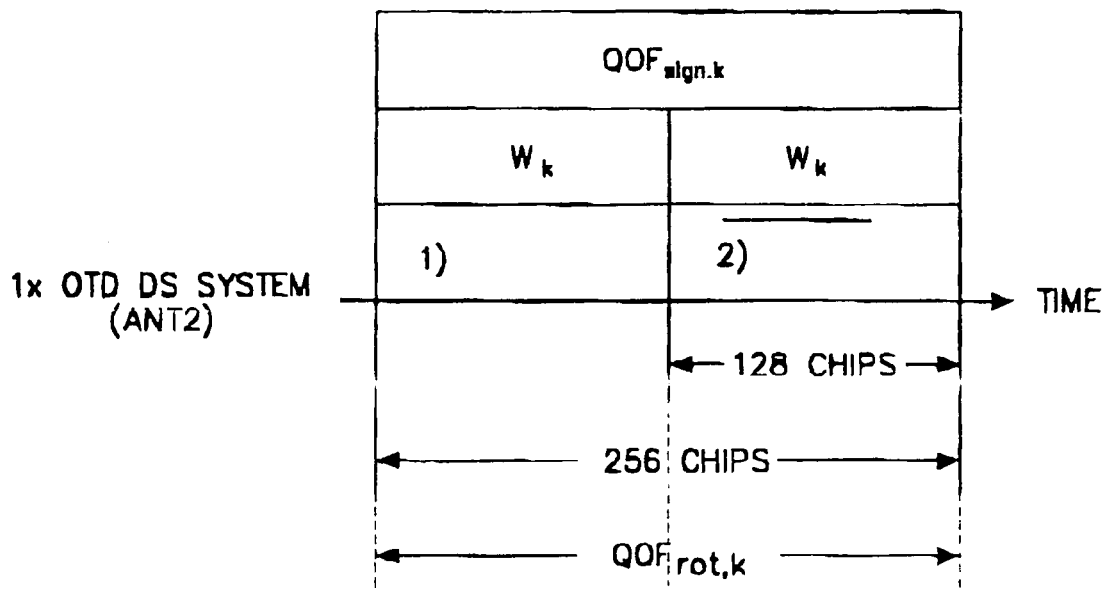
FIG. 12C is a timing diagram explaining the operation of a spreader at a second antenna in the 1× direct spreading system using orthogonal transmit diversity according to a third embodiment of the present invention.

Next, a description will be made of spreading operation in the 1× OTD direct spreading system, with reference to FIGS. 7, 12B and 12C, wherein FIG. 12B shows a timing diagram for the first antenna and FIG. 12C shows a timing diagram for the second antenna. The 1× OTD direct spreading system according to the third embodiment uses the quasi-orthogonal spreading codes of length 256, and with regard to the first antenna, the spreading codes output from the rotator 720 of FIG. 7 are shown in FIG. 12B.

In FIG. 7, when the first I and Q component symbols out of the symbols repeated by the symbol repeaters 160 and 162 of FIG. 1 are input to the adders 710 and 715, the adder 700 adds the Walsh code of length 128 and the leading 128-chip portion of the sign component $QOF_{sign}$ of the quasi-orthogonal sequence of length 256, as shown in FIG. 12B, and provides the added signals to the adders 710 and 715. The adders 710 and 715 then add the I and Q component symbols, respectively, to the signals output from the adder 700, and provide the added signals to the rotator 720. The rotator 720 then rotates the 128-chip input signals according to the leading 128-chip portion of the input phase component $QOF_{rot}$ of the quasi-orthogonal code of length 256. Thereafter, when the second I and Q component symbols out of the symbols repeated by the symbol repeaters 160 and 162 of FIG. 1 are input to the adders 710 and 715, respectively, the adder 700 adds the Walsh code of length 128 and the following 128-chip portion of the sign component $QOF_{sign}$ of the quasi-orthogonal sequence of length 256, as shown in FIG. 12B, and provides the added signals to the adders 710 and 715. The adders 710 and 715 then add the I and Q component symbols, respectively, to the signals output from the adder 700, and provide the added signals to the rotator 720. The rotator 720 then rotates the 128-chip input signals according to the following 128-chip portion of the input phase component $QOF_{rot}$ of the quasi-orthogonal code of length 256.

Referring to FIG. 12B, the first input symbol out of the symbols repeated by the symbol repeaters 160 and 162 of FIG. 1 is added to the Walsh code of length 128 and the leading 128-chip portion of the sign component $QOF_{sign}$ of the quasi-orthogonal code of length 256, and then rotated according to the leading 128-chip portion of the phase component $QOF_{rot}$ of the quasi-orthogonal code of length 256. Subsequently, in the same manner, the second input symbol is added to the Walsh code of length 128 and the following 128-chip portion of the sign component $QOF_{sign}$ of the quasi-orthogonal code of length 256, and then rotated according to the following 128-chip portion of the phase component $QOF_{rot}$ of the quasi-orthogonal code of length 256.

With regard to the second antenna, the spreading codes output from the rotator 720 of FIG. 7 are shown in FIG. 12C. When the first I and Q component symbols out of the symbols repeated by the symbol repeaters 164 and 166 of FIG. 1 are input to the adders 710 and 715, respectively, the adder 700 adds the Walsh code of length 128 and the leading 128-chip portion of the sign component $QOF_{sign}$ of the quasi-orthogonal sequence of length 256, as shown in FIG. 12C, and provides the added signals to the adders 710 and 715. The adders 710 and 715 then add the I and Q component symbols, respectively, to the signals output from the adder 700, and provide the added signals to the rotator 720. The rotator 720 then rotates the 128-chip input signals according to the leading 128-chip portion of the input phase component $QOF_{rot}$ of the quasi-orthogonal code of length 256.

The second I and Q component symbols out of the symbols repeated by the symbol repeaters 164 and 166 of FIG. 1 are inverted symbols obtained by inverting the first I and Q component symbols. When the inverted symbols are input to the adders 710 and 715, the adder 700 adds the Walsh code of length 128 and the following 128-chip portion of the sign component $QOF_{sign}$ of the quasi-orthogonal sequence of length 256, as shown in FIG. 12C, and provides the added signals to the adders 710 and 715. The adders 710 and 715 then add the I and Q component symbols, respectively, to the signals output from the adder 700, and provide the added signals to the rotator 720. The rotator 720 then rotates the 128-chip input signals according to the following 128-chip portion of the input phase component $QOF_{rot}$ of the quasi-orthogonal code of length 256.

Referring to FIG. 12C, the first input symbol out of the symbols repeated by the symbol repeaters 164 and 166 of FIG. 1 is added to the Walsh code of length 128 and the leading 128-chip portion of the sign component $QOF_{sign}$ of the quasi-orthogonal code of length 256, and then rotated according to the leading 128-chip portion of the phase component $QOF_{rot}$ of the quasi-orthogonal code of length 256. Subsequently, in the same manner, the second input symbol obtained by inverting the first input symbol is added to the Walsh code of length 128 and the following 128-chip portion of the sign component $QOF_{sign}$ of the quasi-orthogonal code of length 256, and then rotated according to the following 128-chip portion of the phase component $QOF_{rot}$ of the quasi-orthogonal code of length 256.

Next, a description will be made of spreading operation in the 3× non-OTD direct spreading system, with reference to FIGS. 7 and 12D. The 3× non-OTD direct spreading system according to the third embodiment uses the quasi-orthogonal spreading codes of length 512, and the spreading codes output from the rotator 720 of FIG. 7 are shown in FIG. 12D.

Figure 12D:
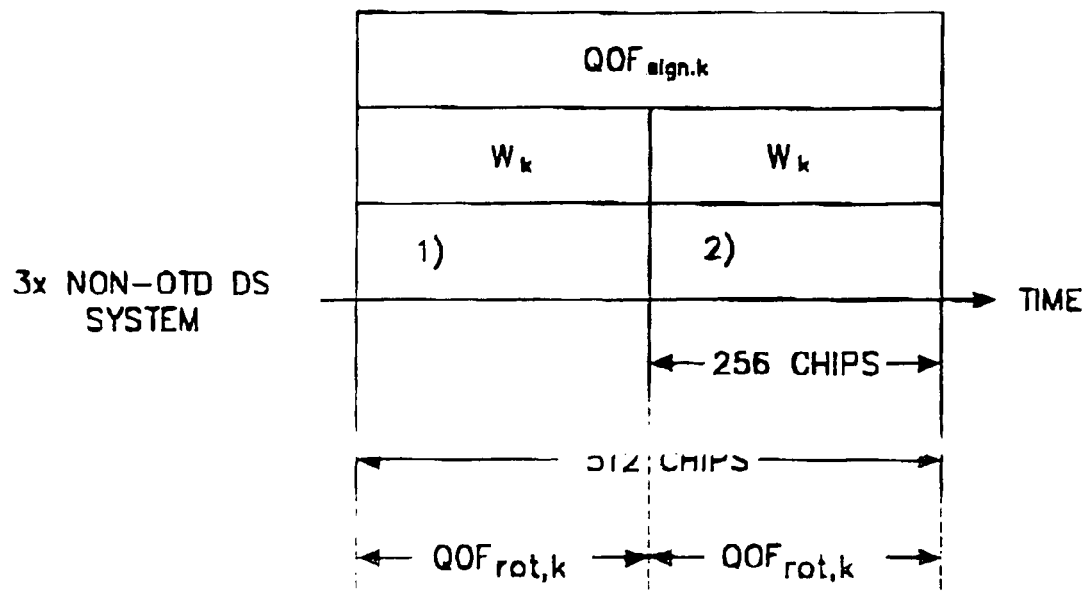
FIG. 12D is a timing diagram explaining the operation of a spreader in the 3× direct spreading system not using orthogonal transmit diversity according to a third embodiment of the present invention.

In FIG. 7, when the I and Q component symbols are input to the adders 710 and 715, respectively, the adder 700 adds the Walsh code of length 256 and the leading 256-chip portion of the sign component $QOF_{sign}$ of the quasi-orthogonal sequence of length 512, as shown in FIG. 12D, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the leading 256-chip portion of the input phase component $QOF_{rot}$ of the quasi-orthogonal code of length 512. After this process, when the next I and Q component symbols are input to the adders 710 and 715, the adder 700 adds the Walsh code of length 256 and the following 256-chip portion of the sign component $QOF_{sign}$ of the quasi-orthogonal sequence of length 512, as shown in FIG. 12D, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the following 256-chip portion of the input phase component $QOF_{rot}$ of the quasi-orthogonal code of length 512.

Referring to FIG. 12D, one input symbol is added to the Walsh code of length 256 and the leading 256-chip portion of the sign component $QOF_{sign}$ of the quasi-orthogonal code of length 512, and then rotated according to the leading 256-chip portion of the phase component $QOF_{rot}$ of the quasi-orthogonal code of length 512. Subsequently, the next input symbol is added to the Walsh code of length 256 and the following 256-chip portion of the sign component $QOF_{sign}$ of the quasi-orthogonal code of length 512, and then rotated according to the following 256-portion of the phase component $QOF_{rot}$ of the quasi-orthogonal code of length 512.

Figure 12E:
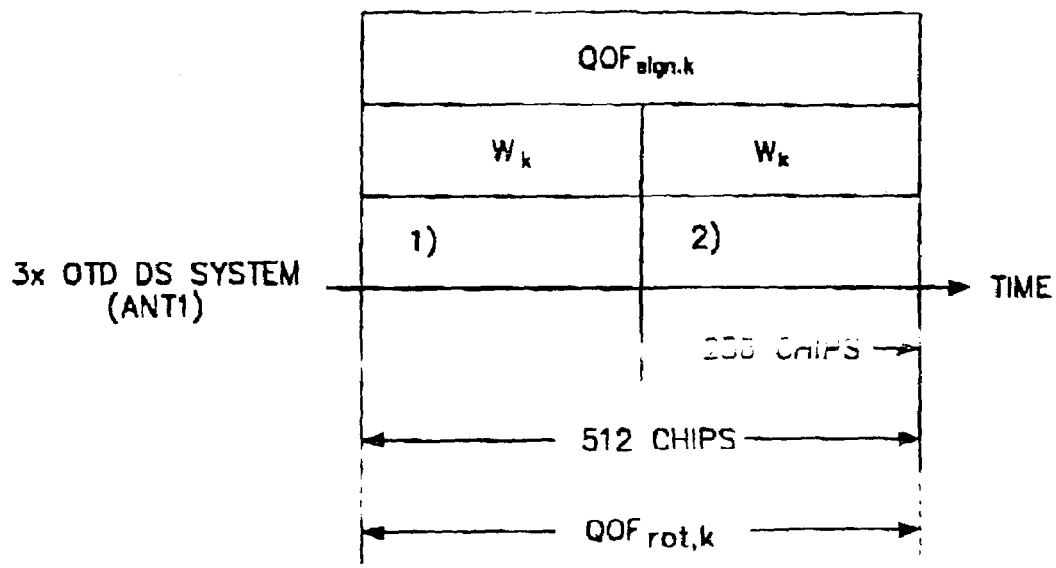
FIG. 12E is a timing diagram explaining the operation of a spreader at a first antenna in the 3× direct spreading system using orthogonal transmit diversity according to a third embodiment of the present invention.
Figure 12F:
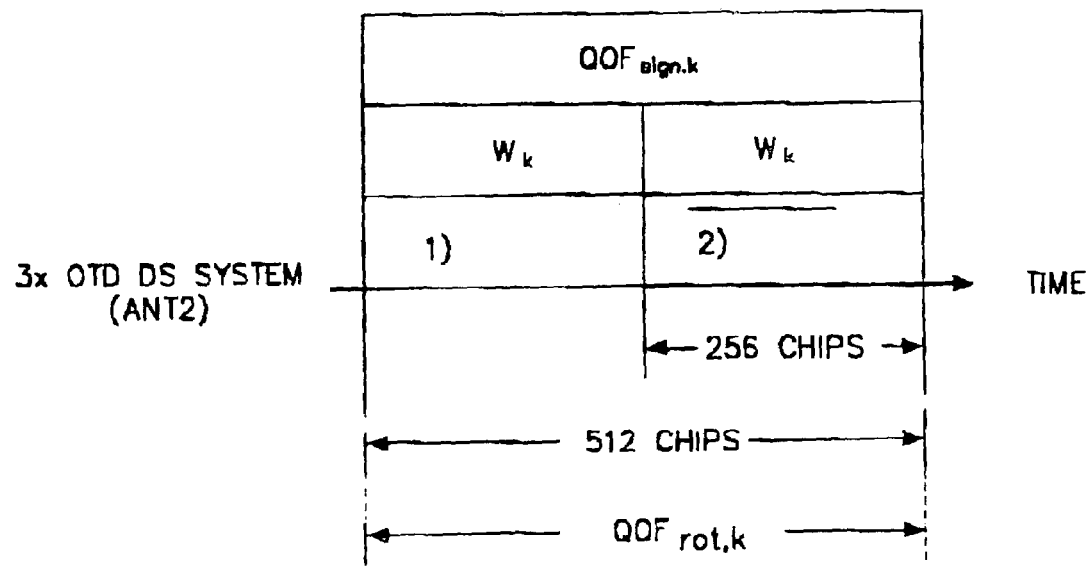
FIG. 12F is a timing diagram explaining the operation of a spreader at a second antenna in the 3× direct spreading system using orthogonal transmit diversity according to a third embodiment of the present invention.

Further, a description will be made of spreading operation in the 3× OTD direct spreading system, with reference to FIGS. 7, 12E and 12F, wherein FIG. 12E shows the timing diagram for the first antenna and FIG. 12F shows the timing diagram for the second antenna. The 3× OTD direct spreading system according to the third embodiment uses the quasi-orthogonal spreading codes of length 512.

With regard to the first antenna, the spreading codes output from the rotator 720 of FIG. 7 are shown in FIG. 12E. In FIG. 7, when the I and Q component symbols are input to the adders 710 and 715, respectively, the adder 700 adds the Walsh code of length 256 and the leading 256-chip portion of the sign component $QOF_{sign}$ of the quasi-orthogonal sequence of length 512, as shown in FIG. 12E, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the leading 256-chip portion of the input phase component $QOF_{rot}$ of the quasi-orthogonal code of length 512. When the second I and Q component symbols out of the symbols repeated by the symbol repeaters 160 and 162 of FIG. 1 are input to the adders 710 and 715, respectively, the adder 700 adds the Walsh code of length 256 and the following 256-chip portion of the sign component $QOF_{sign}$ of the quasi-orthogonal sequence of length 512, as shown in FIG. 12E, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the following 256-chip portion of the input phase component $QOF_{rot}$ of the quasi-orthogonal code of length 512.

Referring to FIG. 12E, the first input symbol out of the symbols repeated by the symbol repeaters 160 and 162 of FIG. 1 is added to the Walsh code of length 256 and the leading 256-chip portion of the sign component $QOF_{sign}$ of the quasi-orthogonal code of length 512, and then rotated according to the leading 256-chip portion of the phase component $QOF_{rot}$ of the quasi-orthogonal code of length 512. Subsequently, in the same manner, the second input symbol is added to the Walsh code of length 256 and the following 256-chip portion of the sign component $QOF_{sign}$ of the quasi-orthogonal code of length 512, and then rotated according to the following 256-chip portion of the phase component $QOF_{rot}$ of the quasi-orthogonal code of length 512.

With regard to the second antenna, the spreading codes output from the rotator 720 of FIG. 7 are shown in FIG. 12F. When the I and Q component symbols out of the symbols repeated by the symbol repeaters 164 and 166 of FIG. 1 are input to the adders 710 and 715, respectively, the adder 700 adds the Walsh code of length 256 and the leading 256-chip portion of the sign component $QOF_{sign}$ of the quasi-orthogonal sequence of length 512, as shown in FIG. 12F, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the leading 256-chip portion of the input phase component $QOF_{rot}$ of the quasi-orthogonal code of length 512.

The second I and Q symbols out of the symbols repeated by the symbol repeaters 164 and 166 are the inverted symbols obtained by inverting the first symbols. When the inverted symbols are input to the adders 710 and 715, respectively, the adder 700 adds the Walsh code of length 256 and the following 256-chip portion of the sign component $QOF_{sign}$ of the quasi-orthogonal sequence of length 512, as shown in FIG. 12F, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the following 256-chip portion of the input phase component $QOF_{rot}$ of the quasi-orthogonal code of length 512.

Referring to FIG. 12F, the first input symbols out of the symbols repeated by the symbol repeaters 164 and 166 of FIG. 1 are added to the Walsh code of length 256 and the leading 256-chip portion of the sign component $QOF_{sign}$ of the quasi-orthogonal code of length 512, and then rotated according to the leading 256-chip portion of the phase component $QOF_{rot}$ of the quasi-orthogonal code of length 512. Subsequently, in the same manner, the second input symbols obtained by inverting the first symbols are added to the Walsh code of length 256 and the following 256-chip portion of the sign component $QOF_{sign}$ of the quasi-orthogonal code of length 512, and then rotated according to the following 256-chip portion of the phase component $QOF_{rot}$ of the quasi-orthogonal code of length 512.

Next, a description will be made of spreading operation in the 3x multicarrier system, with reference to FIGS. 7 and 12G. The 3x multicarrier system according to the third embodiment uses the spreading codes of length 256 for all the three carriers. The spreading codes output from the rotator 720 of FIG. 7 are shown in FIG. 12G.

Figure 12G:
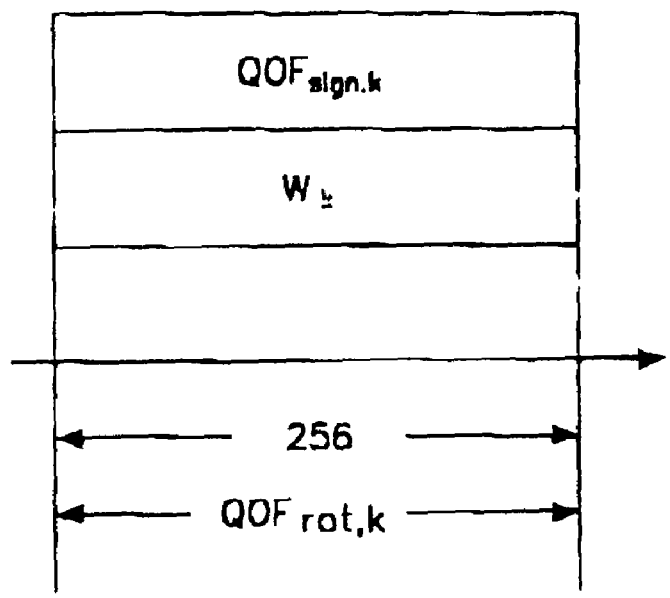
FIG. 12G is a timing diagram explaining the operation of a spreader in the 3× multicarrier system using orthogonal transmit diversity according to a third embodiment of the present invention.

When the I and Q component symbols are input to the adders 710 and 715, respectively, the adder 700 adds the Walsh code of length 256 and the sign component $QOF_{sign}$ of the quasi-orthogonal sequence of length 256, as shown in FIG. 12G, and provides the added signals to the adders 710 and 715. The adders 710 and 715 then add the I and Q component symbols, respectively, to the signals output from the adder 700, and provide the added signals to the rotator 720. The rotator 720 then rotates the 256-chip input signals according to the input phase component $QOF_{rot}$ of the quasi-orthogonal code of length 256.

Referring to FIG. 12G, one input symbol is added to the Walsh code of length 256 and the sign component $QOF_{sign}$ of the quasi-orthogonal code of length 256, and then rotated according to the phase component $QOF_{rot}$ of the quasi-orthogonal code of length 256.

As described above, the novel device and method can minimize interference between the spreading codes in the OTD direct spreading system and multicarrier system. Particularly, when overlay occurs at a certain carrier in the multicarrier system, it is possible to minimize the interference between 1x user and the 3x user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A channel spreading method in a CDMA (Code Division Multiple Access) communication system which spreads a pair of symbols obtained by repeating a first symbol with a quasi-orthogonal code having a given length to transmit the spread symbols through a first antenna and spreads a second symbol and an inverted symbol of said second symbol obtained by repeating said second symbol with said quasi-orthogonal code to transmit the spread symbols through a second antenna at the same time, the method comprising the steps of:

spreading one of said pair of symbols obtained by repeating said first symbol with a portion of said quasi-orthogonal code and spreading another symbol of said pair of symbols with a remaining portion of said quasi-orthogonal code;

spreading the second symbol with a portion of said quasi-orthogonal code and spreading said inverted symbol of said second symbol with the remaining portion of said quasi-orthogonal code;

generating a mask index and a Walsh code index corresponding to an input index for generating the quasi-orthogonal code;

generating a mask for the quasi-orthogonal code corresponding to the mask index, and generating a Walsh code corresponding to the Walsh code index; and outputting, as the quasi-orthogonal code, a quasi-orthogonal code generated by mixing a mask for the generated quasi-orthogonal code with the Walsh code.

2. The channel spreading method as claimed in claim 1, wherein the quasi-orthogonal code spreading step comprises the step of mixing one symbol with a chip signal of a first half period of the quasi-orthogonal code and mixing another symbol with a chip signal of a second half period of the quasi-orthogonal code, so as to spread two symbols for duration of one quasi-orthogonal code.

3. A channel spreading device in a CDMA communication system having first and second antennas to perform an orthogonal transmit diversity function, comprising:

a first transmitter having a first spreader for spreading a pair of symbols obtained by repeating a first symbol with a quasi-orthogonal code having a given length to transmit the spread symbols through a first antenna, spreading one of said pair of symbols with a portion of said quasi-orthogonal code and spreading another symbol of said pair of symbols with a remaining portion of said quasi-orthogonal code;

a second transmitter having a second spreader for spreading a second symbol and an inverted symbol of said second symbol obtained by repeating said second symbol with said quasi-orthogonal code to transmit the spread symbols through a second antenna, spreading said second symbol with a portion of said quasi-orthogonal code and spreading said inverted symbol of said second symbol with the remaining portion of said quasi-orthogonal code;

a controller for generating a mask index and a Walsh code index corresponding to an input index for generating the quasi-orthogonal code;

a mask generator for generating a mask for the quasi-orthogonal code corresponding to the mask index;

a Walsh code generator for generating a Walsh code corresponding to the Walsh code index; and a spreading code generator for outputting, as the quasi-orthogonal code, the quasi-orthogonal code generated by mixing a mask for the generated quasi-orthogonal code with the Walsh code.

4. The channel spreading device as claimed in claim 3, wherein each of the first and second spreaders mixes one symbol with a chip signal of a first half period of the quasi-orthogonal code and mixes another symbol with a chip signal of a second half period of the quasi-orthogonal code, so as to spread two symbols for duration of one quasi-orthogonal code.

* * * * *

UNITED STATES PATENT AND TRADEMARK OFFICE
CERTIFICATE OF CORRECTION

PATENT NO.   : 6,963,601 B1  Page 1 of 1
DATED        : November 8, 2005
INVENTOR(S)  : Jae-Yoel Kim et al.

It is certified that error appears in the above-identified patent and that said Letters Patent is hereby corrected as shown below:

Title page,
Item [75], Inventors, "Hae-Won Kang" should be -- Hee Won Kang --.

Signed and Sealed this

Twenty-third Day of May, 2006

JON W. DUDAS
*Director of the United States Patent and Trademark Office*